US011799923B2

(12) United States Patent
Jensen et al.

(10) Patent No.: US 11,799,923 B2
(45) Date of Patent: Oct. 24, 2023

(54) DISPLAYING A MESSAGE WITHIN A GRAPHICAL INTERFACE OF A CONFERENCE

(71) Applicant: Zoom Video Communications, Inc., San Jose, CA (US)

(72) Inventors: Patrick John Jensen, Fresno, CA (US); Michael Adrian White, Alpine, UT (US)

(73) Assignee: Zoom Video Communications, Inc., San Jose, CA (US)

(*) Notice: Subject to any disclaimer, the term of this patent is extended or adjusted under 35 U.S.C. 154(b) by 0 days.

(21) Appl. No.: 17/573,888

(22) Filed: Jan. 12, 2022

(65) Prior Publication Data
US 2023/0224342 A1 Jul. 13, 2023

(51) Int. Cl.
*H04L 65/401* (2022.01)
*H04L 51/046* (2022.01)
*H04L 65/403* (2022.01)
*H04L 51/23* (2022.01)

(52) U.S. Cl.
CPC .......... *H04L 65/401* (2022.05); *H04L 51/046* (2013.01); *H04L 51/23* (2022.05); *H04L 65/403* (2013.01)

(58) Field of Classification Search
CPC ... H04L 65/401; H04L 51/046; H04L 65/403; H04L 51/23
See application file for complete search history.

(56) References Cited

U.S. PATENT DOCUMENTS

| 6,868,442 | B1 | 3/2005 | Burdeau |
| 7,167,920 | B2 | 1/2007 | Traversat et al. |
| 8,224,315 | B2 | 7/2012 | Law et al. |
| 8,537,981 | B1 | 9/2013 | Cyriac et al. |
| 9,742,709 | B1 | 8/2017 | Aich |
| 9,882,846 | B1* | 1/2018 | Cohen ................. H04L 65/1069 |
| 10,212,570 | B1 | 2/2019 | Ramalingam |
| 10,826,861 | B1* | 11/2020 | Borg ...................... H04L 67/08 |
| 2003/0114174 | A1 | 6/2003 | Walsh et al. |

(Continued)

FOREIGN PATENT DOCUMENTS

| EP | 2854396 A1 | 4/2015 |
| WO | 2021017930 A1 | 2/2021 |

OTHER PUBLICATIONS

Google Chrome will now hide embarrassing notifications when you are sharing your screen., Liam Tung, Jan. 26, 2021., 6 pages.

(Continued)

*Primary Examiner* — Caroline H Jahnige
(74) *Attorney, Agent, or Firm* — Young Basile Hanlon & MacFarlane, P.C.

(57) ABSTRACT

A server or an on-premises computing node accesses a message and a destination tag indicating one or more client devices participating in a conference to receive the message. The server or the on-premises computing node determines a configuration for the message based on a source of the message. The server or the on-premises computing node transmits the message to the one or more client devices indicated in the destination tag to configure the one or more client devices to display the message according to the configuration within a display region associated with the conference.

18 Claims, 11 Drawing Sheets

(56) References Cited

U.S. PATENT DOCUMENTS

| | | | |
|---|---|---|---|
| 2007/0156811 A1* | 7/2007 | Jain | H04L 12/1827 |
| | | | 709/204 |
| 2008/0095128 A1* | 4/2008 | Fong | H04L 47/10 |
| | | | 370/338 |
| 2008/0205619 A1 | 8/2008 | Kalaboukis et al. | |
| 2011/0117886 A1* | 5/2011 | Travis | H04L 65/403 |
| | | | 455/412.2 |
| 2011/0119597 A1 | 5/2011 | Yellamraju et al. | |
| 2013/0290870 A1 | 10/2013 | Jones et al. | |
| 2014/0019599 A1 | 1/2014 | Endou | |
| 2015/0095750 A1* | 4/2015 | Nishio | G06F 40/166 |
| | | | 715/202 |
| 2015/0156321 A1 | 6/2015 | Abnett et al. | |
| 2016/0044456 A1 | 2/2016 | Lott et al. | |
| 2016/0283909 A1 | 9/2016 | Adiga | |
| 2017/0195265 A1 | 7/2017 | Billi et al. | |
| 2018/0113577 A1 | 4/2018 | Burns et al. | |
| 2020/0249821 A1* | 8/2020 | Mao | G06F 3/04817 |
| 2021/0072867 A1* | 3/2021 | Ryall | H04L 65/403 |
| 2022/0150210 A1 | 5/2022 | Agarwal et al. | |
| 2022/0191330 A1* | 6/2022 | Khire | H04M 3/568 |
| 2022/0300960 A1* | 9/2022 | Gutzeit | G06Q 20/3829 |
| 2023/0066231 A1* | 3/2023 | White | G06F 3/0481 |

OTHER PUBLICATIONS

International Search Report and Written Opinion dated May 8, 2023 in corresponding PCT Application No. PCT/US2023/010086.

* cited by examiner

DISPLAYING A MESSAGE WITHIN A GRAPHICAL INTERFACE OF A CONFERENCE

FIELD

This disclosure relates to transmitting a message for display within a graphical interface of a conference, such as an online conference implemented over a network.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
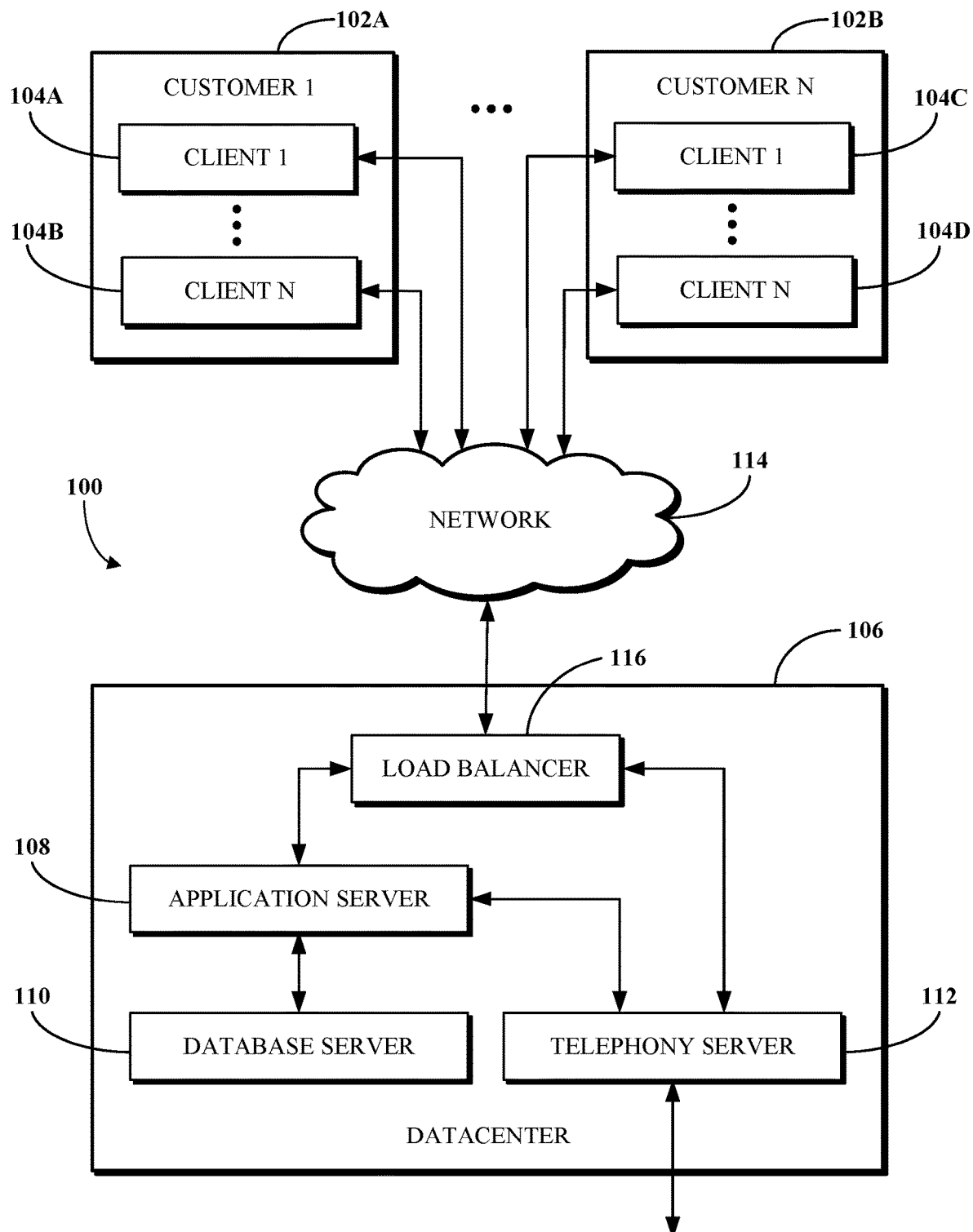
FIG. 1 is a block diagram of an example of an electronic computing and communications system.

Urgent messages are from time to time communicated in personal and professional settings. Generally, an urgent message is or includes information usable to alert a recipient as to an urgent event, situation, or other occurrence, for example, to advise or suggest that the recipient take some specified or unspecified action. Urgent messages may, in particular, be delivered to a computing device of a user. Examples of urgent messages may include, without limitation, messages from a supervisor about an urgent assignment, messages from an administrator about an event (e.g., a weather event or an intruder on a premises) that requires an urgent response, or messages based on sensor data (e.g., a chemical leak or a fire) that are to be addressed quickly. In an ideal situation, the user receives an alert (e.g., a vibration of the computing device, a sound played at the computing device, or an icon displayed on a screen of the computing device) and the user quickly reviews the urgent message, which may be delivered using technologies such as short message service (SMS), email, push notifications, and browser notifications. Situations that cause urgent messages to be transmitted to a computing device may occur when the user is working at the computing device and capable of being distracted to review the messages or during times when the user is paying attention to something else (e.g., a conference that the user is participating in via the computing device) and unable to immediately review messages received using technologies outside the conference (e.g., email or SMS).

Typically, a user of a computing device has multiple technologies available to receive urgent messages. For example, the computing device may receive push notifications including messages from applications (e.g., SMS messages, email messages, and urgent messages from other applications) that are displayed prominently on a screen. However, when the computing device is in a conference (e.g., an online video conference), the user may have difficulty receiving urgent messages or it may be impractical or disruptive for the user to review a message. For example, a user accessing a conference via a laptop computer may put away his/her mobile phone and ignore email or other alert messages on the laptop computer during the conference. Techniques for providing urgent messages to the computing device accessing the conference may be desirable.

One solution for providing messages during the conference is an in-conference chat functionality. However, the in-conference chat functionality is not featured prominently on the screen. Furthermore, in conferences with many participants, there may be many messages sent over the chat functionality at any given moment, and the high volume of those messages may result in the messages being ignored by most participants. For example, an all-hands conference of a company with more than 1000 employees might have a number of those employees making small talk or asking questions irrelevant to many others using the chat functionality, with most of the other employees ignoring the small talk or questions. Thus, such in-conference chat functionality is generally unusable to share urgent messages. One additional notable shortcoming with this solution is that participation in in-conference chat functionality of a conference is limited to participants who have joined the conference. As such, a participant of a conference cannot receive an urgent message in the in-conference chat thereof from someone who is not also a participant of the same conference.

Implementations of this disclosure address problems such as these by providing techniques for transmitting and receiving a prominently displayed message during a conference. A server or an on-premises computing node facilitates participation in a conference by multiple client devices connected to conferencing software. When a client device connects to the conference, a service message pipe is created from the server or the computing node to the client device. The service message pipe enables the output of a message within a foreground of a user interface of the conferencing software at some or all client devices connected to the conference. The outputting of the message within the foreground of the user interfaces directs participants' attention to the message, thereby enabling the immediate visibility of the message to some or all participants of a conference.

During the conference, the server or the computing node receives a message and a destination tag. The destination tag indicates a first set of client devices that are to receive the message. The message may be generated manually at a device (e.g., a computing device of an administrator or a supervisor) or may be generated automatically at the server or the computing node based on sensor data or network quality data. The destination tag may be manually generated (for manually generated messages) or may be automatically generated based on a lookup (e.g., in a database or other data store) of client devices impacted by the sensor data or the network quality data. The impacted client devices may be identified, for example, based on default geographic location. The message may be a supervisory message from a host client device of the conference (e.g., a boss tells a subordinate to speak more slowly), an emergency alert message from an administrator client device (e.g., there is an active threat in the building), an alert message based on sensor data received from a sensor (e.g., a message regarding an emergency alert such as fire alarm or chemical leak or a non-emergency alert such as "front door left open"), or a network quality alert message (e.g., poor network connection). For example, in the case of the boss telling the subordinate to speak more slowly, the destination tag may indicate that the client device of the subordinate (and not other client devices in the conference) is to receive the message. In the case of the active threat, the destination tag may indicate that only client devices in the geographic area with the active threat (and not other client devices in other places) are to receive the message. In the case of the chemical leak, the destination tag may indicate that client devices of users who are responsible for managing the chemical leak and are located on the premises are to receive the message. In some cases, a second set of client devices in the conference (e.g., which are not associated with the destination tag) may be provided with an additional message notifying the users of the second set of client devices of the message provided to the first set of client devices associated with the destination tag.

Various techniques for determining the destination tag may be used. In some cases, the messages come from an administrator client device and the destination tag indicates all client devices registered to receive emergency messages from the administrator client device. Where this is implemented in a school or office setting, for example, the client devices registered to receive the emergency messages could correspond to some or all students who attend on-campus classes or some or all employees who work on-site. In some cases, the message is generated manually at an administrator client device or a host client device and the destination tag is also generated manually. In examples, a user of the host client device might wish to ask a participant named Sam to emphasize a certain point, or the user of the host client device might manually generate the message to a participant named Jack and manually indicate that the destination tag includes Sam (identified by a user identifier in an application associated with the conference). In some cases, the message is a network quality alert message and the destination tag includes all devices connected to the impacted network. For example, if the Wi-Fi® router on the northeast corner of the second floor is functioning poorly, the destination tag may include the client devices connected to that Wi-Fi® router. In some cases, the message is generated based on sensor data and the destination tag is determined by looking up impacted devices in a table (or other data structure). For example, if the front door to a school building or an office suite is unlocked, the destination tag may include client devices of security guards or receptionists responsible for the door. If there is a fire or other emergency, the destination tag may include all devices in the impacted geographic locations.

The server or the computing node determines a configuration for the message. A configuration for a message generally refers to or otherwise includes a specification for how the message is to be displayed at the client devices. In some implementations, the configuration specifies at least one of a text color, a highlighting color, a time duration for displaying the message, whether the message includes a dismiss icon, or whether the message includes a confirmation icon. In one example, the configuration includes at least one of following fields: text color, highlighting color, time duration for display (integer number of seconds or unlimited duration), dismiss icon (true or false), confirmation icon (true or false), text font (e.g., Times New Roman or Courier), text font dressing (e.g., bold, italic or underlined), text font size (integer number of points). In the case of a manually-generated message, the generator of the message may specify the configuration. In the case of an automatically-generated message (e.g., based on sensor or network data), the configuration may be determined based on preset configuration data stored at the server or the computing node. Different configurations may be used for public safety messages (e.g., fire safety information detected by the sensor or active shooter information provided by the administrator), service or network impact messages, supervisory messages, and general announcement messages relevant to the conference (e.g., from the host of a conference).

The server or the computing node transmits the message to the first set of client devices indicated in the destination tag using the service message pipe. Each client device from the first set of client devices receives the message and displays the message within a display region (e.g., a window) associated with the conference and according to the received configuration and a local setting. The local setting may indicate, for example, that a ribbon is to be used on a personal computing device (e.g., a mobile phone or a desktop computer), while a splash may be used on a conference room device (e.g., a Zoom Rooms® device) intended for multiple users accessing a conference from the conference room.

Furthermore, a modified message may be transmitted from the server or the computing node to client devices which did not receive the original message (i.e., client devices not included in the first set of client devices) to alert users thereof of a situation, event, or occurrence related to the message that was transmitted to the first set of client devices. For example, if there is an active shooter at a building where the first set of client devices are located, the first set of client devices could be notified using the above technique. The additional client devices could receive a modified message (with a modified configuration) notifying the users thereof that the users of the one or more client devices are experiencing an active shooter situation or an emergency event. In some cases, the modified message may include a suggestion to end and/or reschedule the conference.

According to some implementations, in a conference, a server or a computing node accesses a message and transmits, via a service message pipe, the message to the first set of client devices to which the message is relevant. A client device of the first set of client devices prominently displays the message within a display region (e.g., a window) of the conference. The service message pipe may be unidirectional in that the service message pipe transmits messages from the server or the computing node to the client devices. However, in some cases, the service message pipe may be bidirectional in that the client device that receives the message may transmit an acknowledgement back to the server or the computing node to indicate that the user of the client device received the message. The acknowledgment may be transmitted in response to a user selecting an acknowledge icon or a dismiss icon.

To describe some implementations in greater detail, reference is first made to examples of hardware and software structures used to implement transmission of messages for display within a graphical interface of a conference. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
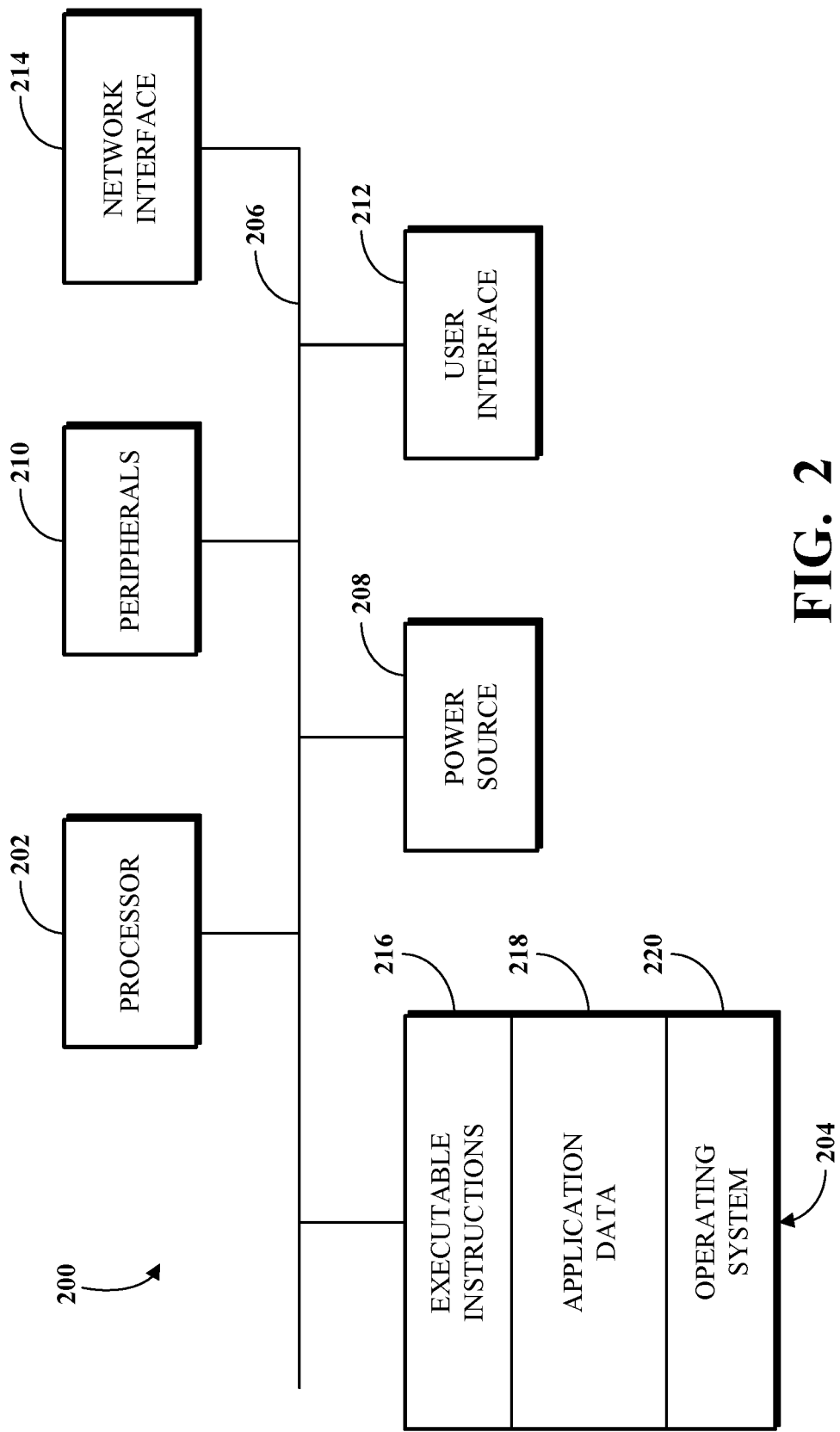
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
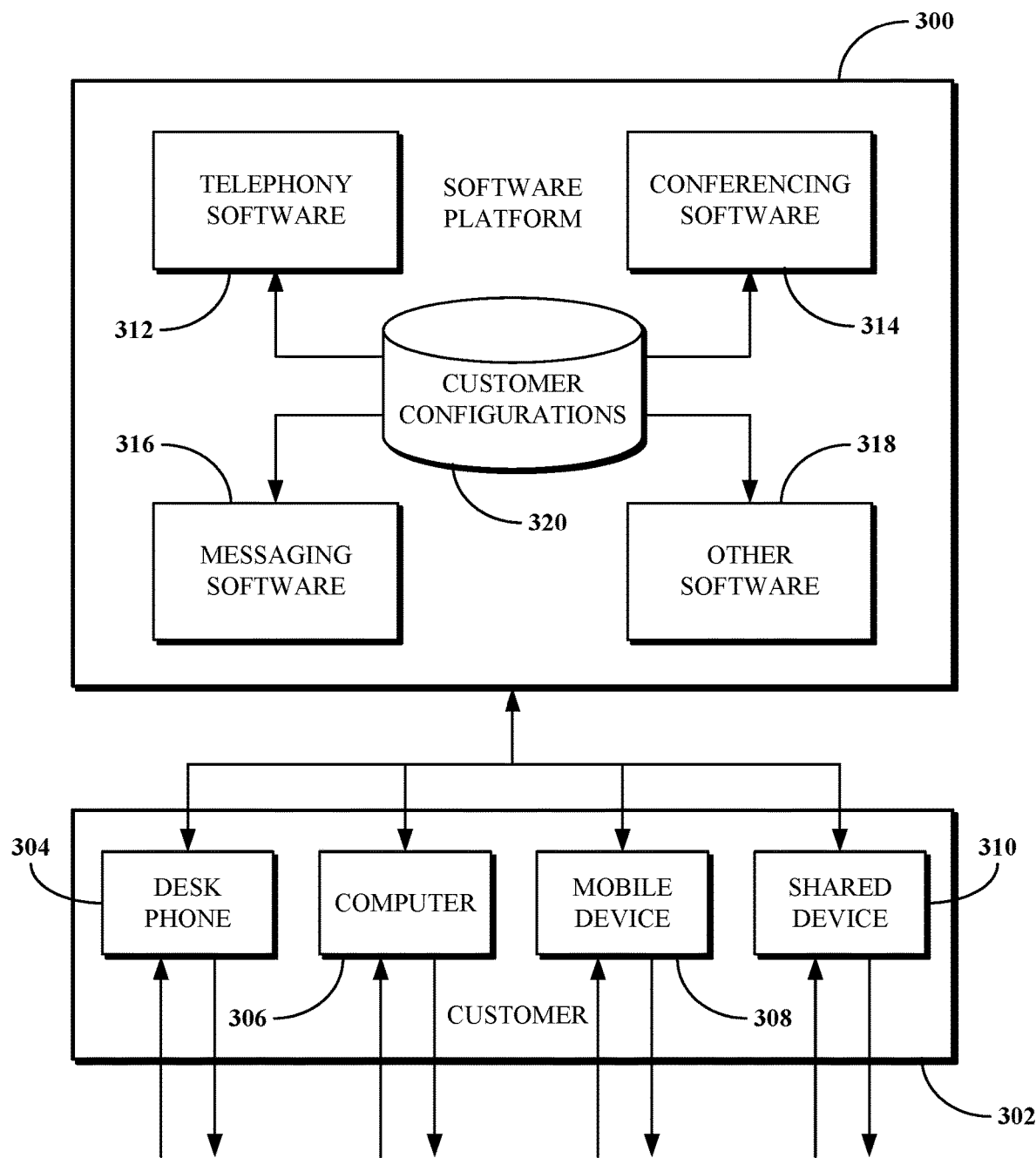
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for transmitting messages for display within a graphical interface of a conference.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
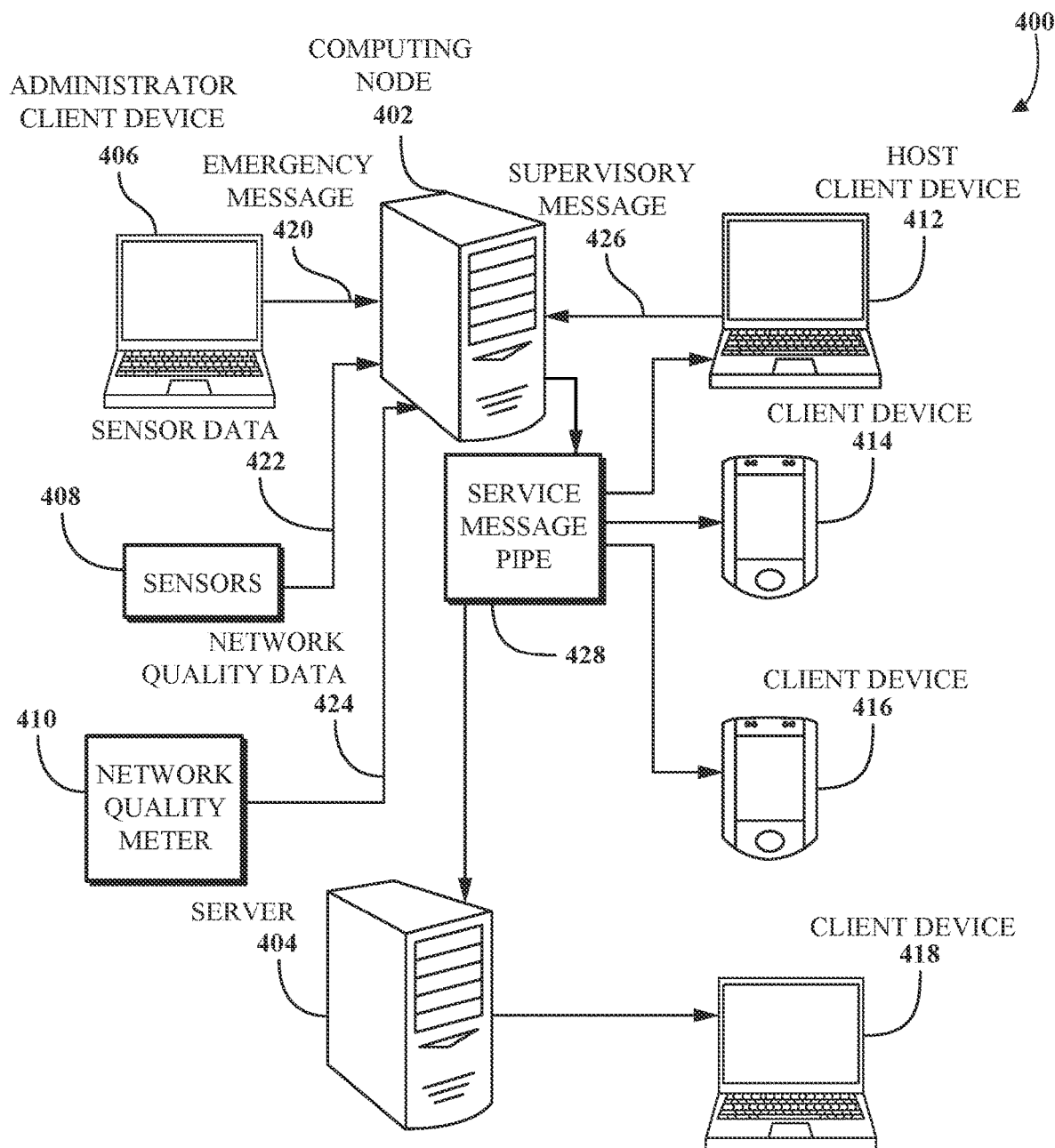
FIG. 4 is a diagram of an example system for transmitting a message during a conference.

FIG. 4 is a diagram of an example system 400 for transmitting a message during a conference. As shown, the system 400 includes a computing node 402, a server 404, an administrator client device 406, sensors 408, a network quality meter 410, a host client device 412, a client device 414, a client device 416, and a client device 418. The computing node 402, the server 404, the administrator client device 406, the sensors 408, the network quality meter 410, the host client device 412, the client device 414, the client device 416, and the client device 418 may communicate with one another via a network (e.g., the network 114 shown in FIG. 1).

The server 404 may correspond to the application server 108. The server 404 may be a dedicated application server for a conferencing application. Each of the admin client device 406, the host client device 412, the client device 414, the client device 416, and the client device 418 may, for example, correspond to the clients 104A, 104B, 104C, and 104D. The host client device 412 may be hosting a conference using the conferencing application, and the client devices 414, 416, and 418 may be participating in the conference.

The computing node 402 resides on a premises (e.g., an office or a building) and provides computing services (e.g., computing services associated with the conferencing application) for the client devices 406, 412, 414, and 416 that are located on the premises. For example, the computing node 402 may provide the computing services when access to an external network (e.g., the network 114) is not available or is available at a network speed (e.g., a download speed or an upload speed) below a threshold network speed. The computing node 402 may provide at least a portion of the functions of the server 404. In some examples, the host client device 412, the client device 414, and the client device 416 may be located on the premises and may connect to the conference via the computing node 402. The client device 418 may be a remote device located outside the premises and may connect to the conference via the server 404. The server 404 and the computing node 402 may communicate with one another over the network.

Some implementations are described as being performed by the computing node 402. However, alternative implementations, the server 404 may perform some or all of the operations described as being performed by the computing node 402. In one implementation, the server 404 performs each and every one of the operations described as being performed by the computing node 402. Alternatively, the computing node 402 may perform some of the functions of the server 404.

The computing node 402 is configured to receive input from one or more sources. For example, as shown, the computing node 402 receives input 420, 422, 424, and 426. The input 420 is an emergency message 420 indicating an emergency situation, event, or occurrence. The computing node 402 receives the emergency message 420 (e.g., an active threat alert) from the administrator client device 406. The emergency message 420 may be composed by a user of the administrator client device 406 for transmission to some or all of the client devices 412, 414, 416, and 418 participating in a conference.

The input 422 is sensor data 422. The computing node 402 receives the sensor data 422 from the sensors 408. The sensors 408 are components configured to measure and/or monitor some aspect of all or a portion of an environment (e.g., a customer premises, such as an office or school building), and the sensor data 422 is data output or otherwise produced using or by the sensors 408. In one example, the sensors 408 may include a fire alarm and the sensor data 422 may include data indicating the presence of a fire. In another example, the sensors 408 may include a chemical spill sensor and the sensor data 422 may include data indicating the presence of a chemical spill. In another example, the sensors 408 may include a motion sensor in a secure area and the sensor data 422 may include detections of movement. In another example, the sensors 408 may include an open door sensor and the sensor data 422 may include information indicating that a door is open.

The input 424 is network quality data 424. The network quality data 424 is a measurement of network speed or jitter at a location (e.g., a router or a computing device) on the network that includes a network quality meter 410. The network quality meter 410 measures the network speed, the latency or the jitter. In one example, the computing node 402 receives the network quality data 424 from a network quality meter 410. The network quality meter 410 measures network quality at network routers on the premises of the computing node 402 and, in some cases, at the client devices 412, 414, 416, and 418 participating in the conference or at the server 404. The network quality meter 410 may be implemented in software, hardware, or a combination of software and hardware residing at the client devices 412, 414, 416, and 418, the server 404, the computing node 402 or the routers. If the network quality meter 410 resides at a client device, affirmative consent of the user of the client device is obtained to transmit network quality measurements to the computing node 402 or the server 404. For example, upon installation of an application associated with the conference, the user may be asked, via a user interface, to confirm that the user agrees to share the network quality data. The user may be provided with reminders (e.g., via a user interface of the conferencing application or via periodic email messages) that the network quality measurements are being shared.

The input 426 is a supervisory message 426. The supervisory message 426 is a message from a host of the conference generated at the host computing device 412. The computing node 402 receives the supervisory message 426 from the host computing device 412. In one example, the host computing device 412 includes a user interface for generating supervisory messages 426. For example, while viewing the conference, the user of the host computing device 412 may press a button to access prompts to enter the text of the supervisory message 426 and the recipients of the supervisory message 426. After entering the text and the recipients, the user of the host computing device 412 may press a send button to send the supervisory message 426 and to return to viewing the conference. The supervisory message 426 may include a message from a user of the host computing device 412 (e.g., a supervisor) to another participant in the conference (e.g., a subordinate) that should be displayed prominently within the graphical output of the conference (e.g., not within a chat message). For example, if the subordinate is speaking to a foreign client, the supervisor might ask the subordinate to speak more slowly to make sure that the foreign client understands what the subordinate is saying.

As might be understood, the emergency message 420 and the supervisory message 426 may be generated manually by human users, while the sensor data 422 and the network quality data 424 may be generated automatically without human involvement. The manually-generated messages 420, 426 may be coupled with a manually-generated destination tag indicating which client devices are to receive the message. For example, for the emergency message 420, a user of the administrator client device 406 may specify user identifiers or geographic locations to which the emergency applies. For the supervisory message 426, a user of the host client device 412 may specify the user identifiers of the subordinates to receive the supervisory message 426.

The automatically-generated data 422, 424 may have automatically-generated destination tags indicating the client devices that are to receive messages generated using the data 422, 424. Generally, messages generated from the sensor data 422 may be provided to client devices of users impacted by or responsible for the associated sensor data 422. For example, messages generated from sensor data 422 associated with a fire in a building may be provided to all client devices in the building. In another example, messages generated from sensor data 422 associated with an open door may be provided to a client device of a custodian responsible for making sure that the door will shortly be closed.

The computing node 402 may generate messages from the automatically-generated data 422, 424. For the network quality data 424, the computing node 402 may transmit a message indicating poor network quality (e.g., the words, "poor network connection") if the network quality data 424 indicates a jitter exceeding a jitter threshold (e.g., 30 milliseconds) or a network speed being below a network speed threshold (e.g., 5 megabits per second). For the sensor data 422, a generated message may include a name or a location of the sensor 408 generating the sensor data 422 and the sensor data 422 itself. For example, if a fire sensor detects a fire, the generated message may be "fire at <location of sensor>," or "fire in your building," if the message is transmitted to client devices in the building where the fire is detected.

Figure 7:
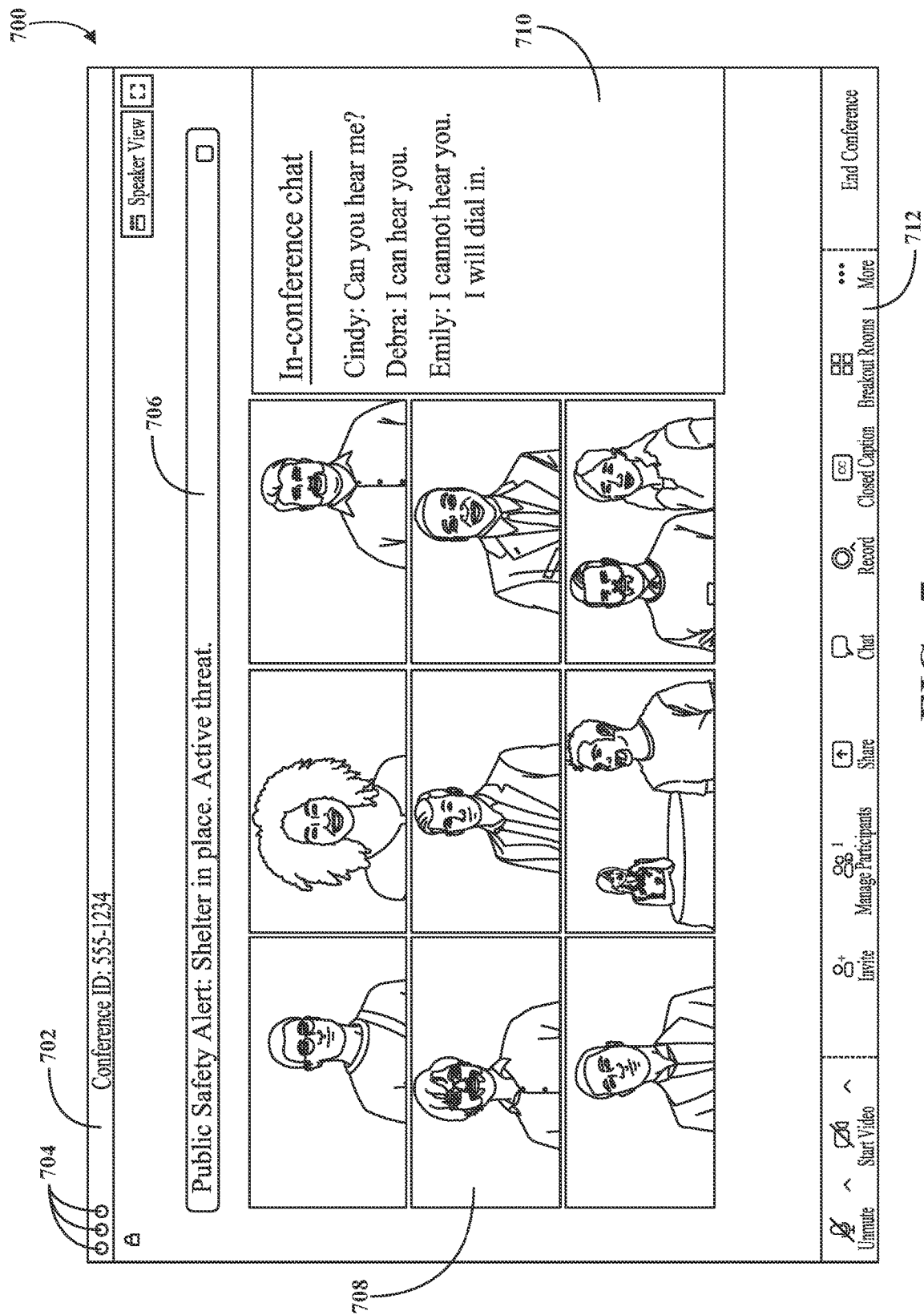
FIG. 7 illustrates an example graphical user interface associated with a conference.

Upon one of the client devices 412, 414, 416, 418 joining the conference, the client device 412, 414, 416, 418 and/or the computing node 402 creates a service message pipe 428 from the computing node 402 to the client devices 412, 414, 416, 418. The service message pipe is created by the client devices 412, 414, 416, 418 registering to the computing node 402. The computing node 402 may be a messaging server using the extensible messaging and presence protocol (XMPP). Once this connection is established, the service message pipe 428 is created whereby the client device 412, 414, 416, 418 may receive real time data, including prioritized chat messages and push notifications. While a single service message pipe 428 is illustrated, in some implementations, each client device 412, 414, 416, 418 may have its own dedicated service message pipe. As shown, the service message pipe 428 connects the computing node 402 directly to on-premises client devices 412, 414, 416. For the off-premises client device 418, the service message pipe 428 connects the client device 418 to the computing node 402 via the server 404. The service message pipe 428 may be a connection between the computing node 402 and each client device 412, 414, 416, 418 participating in the conference. The service message pipe 428 allows the computing node 402 to transmit a message to the client device 412, 414, 416, 418 participating in the conference for display within a foreground of a user interface of the conference so that the message is immediately viewable by the user, for example, as shown in FIG. 7.

In some implementations, the computing node 402 accesses a message (e.g., the emergency message 420, the supervisory message 426, the message generated based on the sensor data 422, or the message generated based on the network quality data 424) and a destination tag indicating a first set of client devices (e.g., the client devices 412, 414, 416, 418) participating in the conference which are to receive the message. The computing node 402 determines a configuration for the message based on a source of the message (e.g., the administrator client device 406, the sensors 408, the network quality meter 410, or the host client device 412). The computing node 402 transmits the message to the client devices 412, 414, 416, 418 indicated in the destination tag to configure the client devices 412, 414, 416, 418 to display the message according to the configuration and within a display region associated with the conference. The configuration includes at least one of a text color, a highlighting color, a time duration for displaying the message, whether the message includes a dismiss icon, or whether the message includes a confirmation icon.

In one example use case, a user of the administrator client device 406, who works as an administrator of a business, receives a notification that there is an active shooter in the Chicago office of the business. The user of the administrator client device 406 creates the emergency message 420 indicating the presence of the active shooter, and sets the destination tag and the configuration of the message. The emergency message 420 may include the text, "Active shooter in Chicago office," a destination tag indicating devices in the Chicago office, and a configuration indicating that bold red letters with a yellow background is to be used and that the message should not be dismissible. Within a few minutes, the user of the administrator client device may also create an email or SMS alert for users who are subscribed to such alerts, informing them of the presence of the active shooter. The client devices display the message within a graphical user interface (GUI) associated with the conference. The message is displayed at the client device in bold red letters with the yellow background and without the dismiss icon, as indicated in the configuration. The message is displayed within a foreground of the user interface of the conference, for example, above the video feeds or screen-sharing feeds of the participants in the conference as illustrated in FIG. 7. The administrator client device 406 transmits the emergency message 420, along with the destination tag and the configuration, to the computing node 402. The computing node 402 places the emergency message 420 into the service message pipe 428 for delivery to the client devices indicated in the destination tag. Furthermore, as additional client devices associated with the destination tag join the conference, the additional client devices also receive the emergency message 420 via the service message pipe 428 and display the emergency message 420. The computing node 402 may create a second message informing other client devices in the conference (which are not located in the Chicago office) of the active shooter situation in the Chicago office. The second message may have a different configuration which is automatically determined based on default settings of the conferencing application. For example, the configuration of the second message may indicate that it is dismissible and that it is displayed in black letters with a white background.

In another example use case, one of the sensors 408 is a motion sensor that detects movement in a secure room of a bank. The motion sensor transmits sensor data 422 to the computing node 402 of the bank indicating that the movement has been detected. In response, the computing node 402 generates a message, "movement detected in secure room," with a destination tag indicating the client devices of the employees who are responsible for the secure room, and a configuration indicating that the message should not be dismissible and should be displayed in bold, italicized, and underlined white letters on a black background. The employees who are responsible for the secure room may be identified based on a data structure listing such employees stored at the computing node 402 or at a database (or other data storage unit) to which the computing node 402 has access. The configuration corresponds to a preset configuration stored at the computing node 402. The generated message is placed into the service message pipe 428 for delivery to the client devices indicated in the destination tag. The client devices display the message within a GUI associated with the conference. The message is displayed in a foreground of the user interface associated with the conference, for example, adjacent to video feeds from the other participants in the conference, as illustrated in FIG. 7. The message lacks a dismiss icon and is displayed in bold, italicized, and underlined white letters on a black background, as set in the configuration.

In yet another example use case, the network quality meter 410 transmits network quality data 424 indicating low network speed (e.g., download speed or upload speed) at a router on the sixteenth floor of the Seattle office of a business. The network quality meter 410 may reside on the router and may measure network speed, latency and jitter at the router. The network quality data 424 is received at the computing node 402 associated with the Seattle office. The computing node 402 generates a message with the text, "poor network quality," the destination tag indicating devices connected to the router on the sixteenth floor of the Seattle office, and the configuration indicating that the message should be dismissible and printed in black text on a white background. The configuration corresponds to a preset configuration stored at the computing node 402. The generated message is placed into the service message pipe 428 for delivery to the client devices indicated in the destination tag. The client devices display the message within a GUI associated with the conference. The message is displayed in a foreground of the user interface associated with the conference, for example, adjacent to video feeds from the other participants in the conference, as illustrated in FIG. 7. The message has a dismiss icon and is displayed in black text on a white background, as set in the configuration In an additional example use case, the user of the host client device 412 is a supervisor and the user of the client device 414 is a subordinate in a meeting with an external participant at the client device 418. While the subordinate is speaking, the supervisor decides that he wants the subordinate to speak more slowly and screenshare some photographs taken at the site visit last week. To communicate this message, the supervisor creates the supervisory message 426 indicating the text, "please speak more slowly and screenshare the photographs taken at the site visit last week." The supervisor indicates, via a user interface at the host client device 412 that the destination tag for the supervisory message 426 includes the client device 414, and that the configuration for the supervisory message 426 indicates that bold black letters on a white background are to be used. After creation of the supervisory message 426, the supervisory message 426 is transmitted from the host client device 412 to the computing node 402. The computing node 402 adds the supervisory message 426 to the service message pipe 428. The supervisory message 426 is transmitted, via the service message pipe 428, to the client device 414 for display thereat. The supervisory message 426 is displayed, at the client device 414, in a foreground of the user interface associated with the conference, for example, adjacent to video feeds from the other participants in the conference, as illustrated in FIG. 7. The message is displayed in bold, black letters on a white background, as set in the configuration In some situations, the client devices 412, 414, 416, 418 receiving the message via the service message pipe 428 may have the conference minimized or running in the background, preventing the user of the client device 412, 414, 416, 418 from seeing the message. In these circumstances, the message may be provided to the client device 412, 414, 416, 418 in another manner, such as via push notification, email, SMS, or browser-based notification. The client device 412, 414, 416, 418 may determine that the conference is minimized or running in the background, for example, by leveraging operating system level permissions to make this determination. For example, operating system level permissions may allow software associated with the conference to determine that the conference is not a dominant computing resource at the client device 412, 414, 416, 418 (i.e., that the conference is running in the background, minimized, or behind another computing resource (e.g., application window) in a stack of computing resources). In response to determining that the conference is not the dominant computing resource, the client device 412, 414, 416, 418 may display the message externally to the conference or prompt the server 404 or the computing node 402 to retransmit the message to the client device 412, 414, 416, 418 for display externally to the conference (e.g., via email, SMS, or browser-based notification).The techniques for transmitting or receiving a message during a conference may be extended for use while the client device 412, 414, 416, 418 is playing a movie or a video game. The computing node 402 or the server 404 may correspond to a movie or video game server that receives messages from specified sources (e.g., government or university campus emergency alerting message sources) and forwards the received messages to client devices 412, 414, 416, 418 which are playing the movie or video game or to which the movie and video game are otherwise being streamed. For example, the administrator client device 406 may be a government or university campus emergency alerting message source. The client device 412, 414, 416, 418 may prominently display the message within a computing resource (e.g., a window) for the movie or the video game based on the configuration set by the government or university campus emergency alerting message source.

Figure 5:
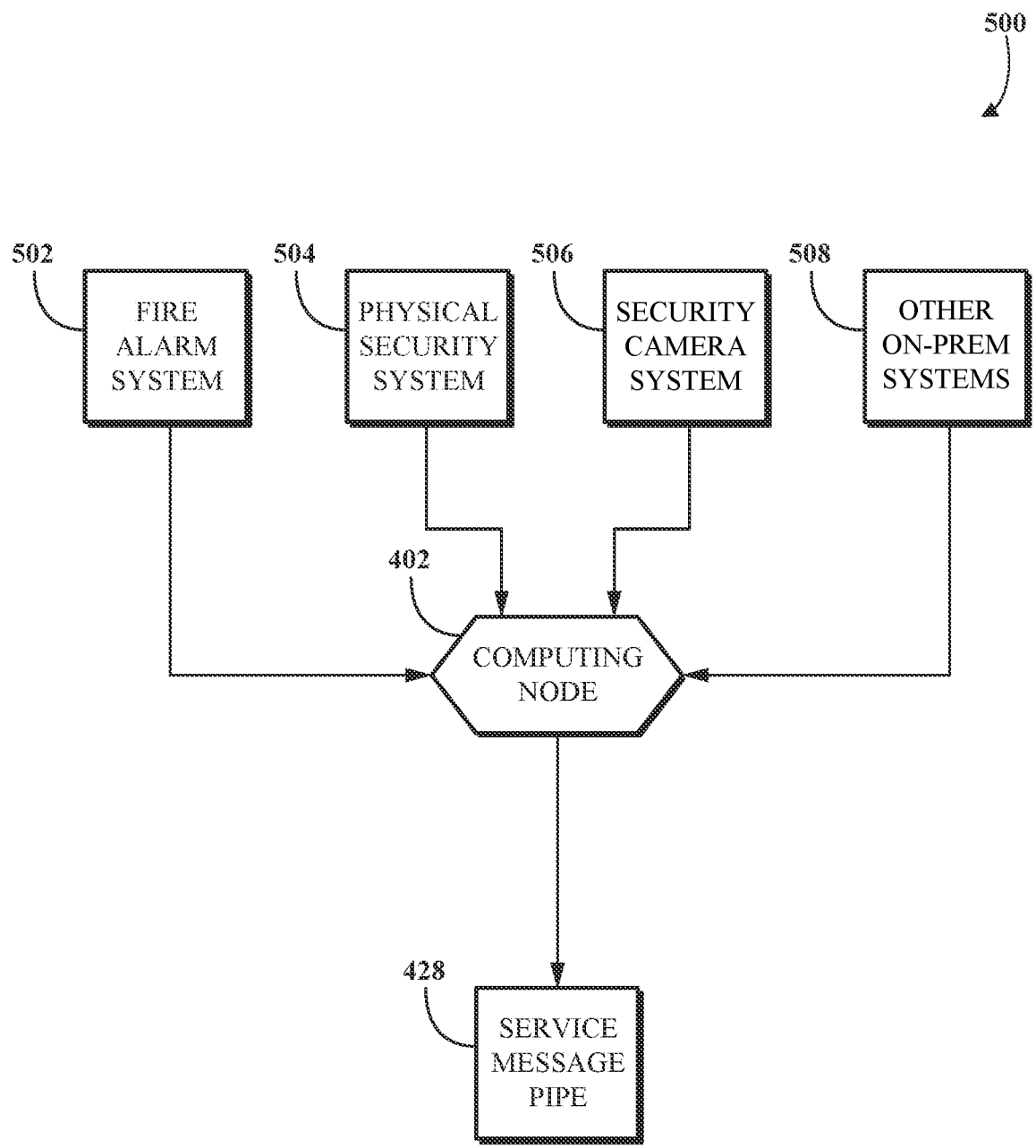
FIG. 5 is a block diagram of an example of systems from which information usable by a computing node to transmit a message during a conference are received.

FIG. 5 is a block diagram 500 of an example of systems from which information usable by the computing node 402 to transmit a message during a conference are received. As shown, the computing node 402 receives input from various sensors including a fire alarm system 502, a physical security system 504, a security camera system 506, and other on-premises systems 508. The fire alarm system 502, the physical security system 504, the security cameras 506, and the other on-premises systems 508 may correspond to the sensors 408 described in conjunction with FIG. 4. For example, each of the systems 502 through 508 may include sensors which are or are otherwise included in the sensors 408. The other on-premises systems 508 may include, for example, chemical spill sensors or weather sensors (e.g., thermometers or barometers).

The computing node 502 generates a message based on data received from the fire alarm system 502, the physical security system 504, the security camera system 506, and the other on-premises systems 508. The message may include an identifier of the sensor generating the data and the generated sensor data. The message may be transmitted if the generated sensor data falls within a range or set of values (e.g., temperature exceeding 50 Celsius (C) for the fire alarm system 502, or a door being opened or motion being detected for the physical security system 504). The range or the set of values for the sensor data from each sensor may be stored at the computing node 402 and set up by an administrator, for example, via an administrator user interface at the administrator client device 406. The administrator user interface may include a list of sensors, a range or set of values for which the message is to be sent for each sensor, and addresses or user identifiers of client devices to which the message is to be sent for each sensor. A destination tag may be generated to identify client devices to which the message is to be transmitted via the service message pipe 428.

The destination tag may be generated, for example, by mapping the sensor to user identifiers of users of devices impacted by the sensors. For example, a message associated with the fire alarm system 502 for a premises may be provided to all client devices that are presently located in the premises or have a stored default location (e.g., office location) at the premises. A message associated with the physical security system 504 or the security camera system 506 of the premises may be provided to client devices associated with security staff at the premises.

In one example use case, the fire alarm system 502 includes a thermometer. The thermometer transmits a message to the computing node 402 when the temperature exceeds 50 C. Upon receiving the message that the temperature exceeds 50 C, the computing node 402 generates a message, for transmission via the service message pipe, to the client devices that are to be notified when the temperature exceeds 50 C. The client devices that are to be notified may be preset by the administrator and stored at the computing node 402. The client devices that are to be notified may include, for example, client devices having a default location on the premises where the fire alarm system 502 is located.

Figure 6:
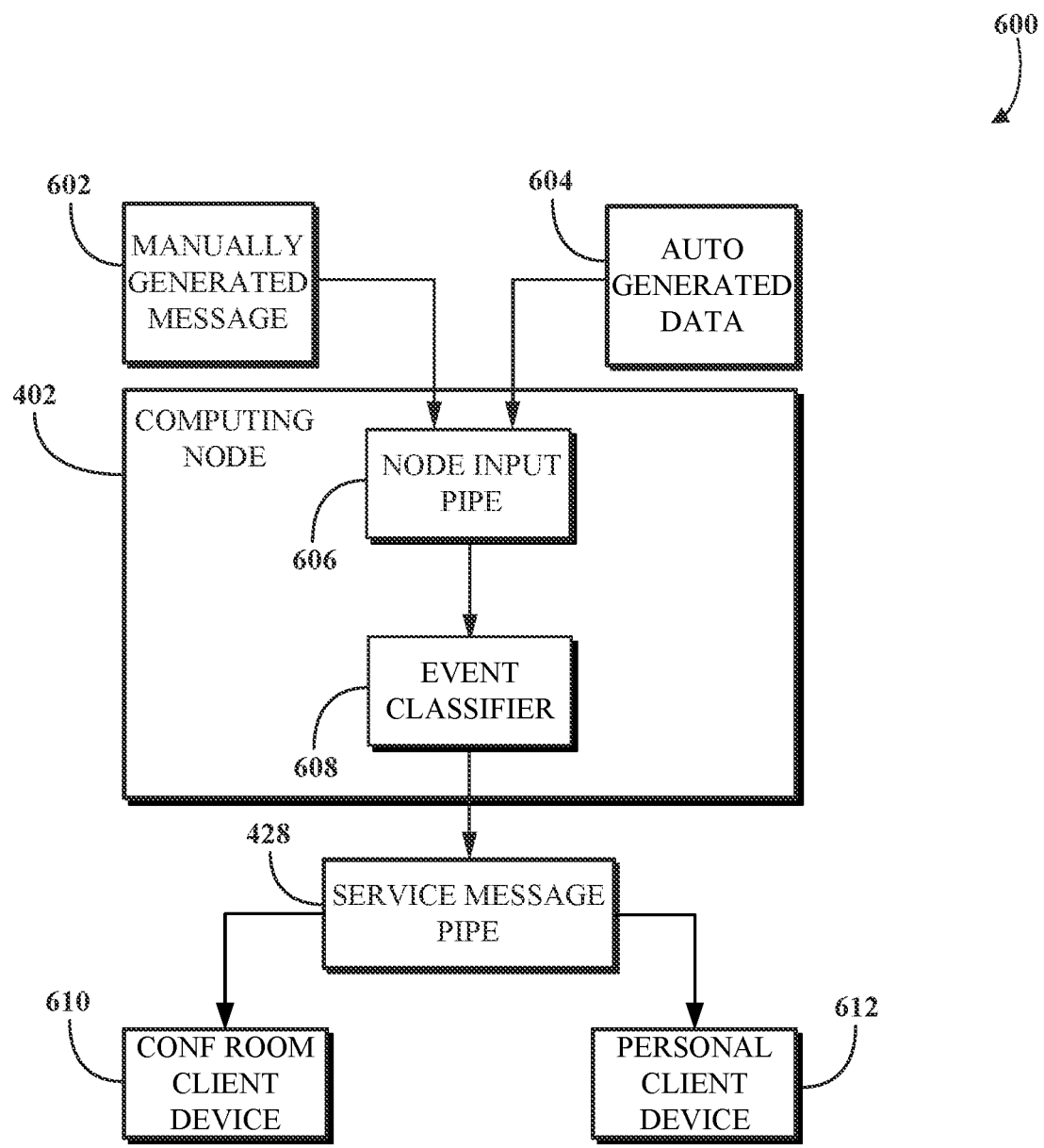
FIG. 6 is a block diagram of an example of a computing node that transmits a message during a conference.

FIG. 6 is a block diagram 600 of the computing node 402 that transmits the message during the conference. As shown, a manually generated message 602 is or automatically generated data 604 are provided to a node input pipe 606 of the computing node 402. The manually generated message 602 may be the emergency message 420 or the supervisory message 426. The automatically generated data 604 may be the sensor data 422 or the network quality data 424.

The node input pipe 606 converts the automatically generated data 604 into a message. The message may include values from the automatically generated data (e.g., "the temperature at the front desk is 50 C") or an indication of a range for the automatically generated data (e.g., "temperature too hot" or "fire detected"). In some cases, a message might not be sent based on the automatically generated data. For example, if the temperature at the front desk is 20 C, the message might not be generated because 20 C is a normal indoor temperature. The determination as to whether a message is sent based on the automatically generated data may be made based on whether the automatically generated data is within a predetermined range or set of values stored at the computing node 402.

The node input pipe 606 applies a destination tag to the messages (e.g., the manually generated message 602 or the message generated based on the automatically generated data 604). In some implementations, the destination tag may indicate a single client device or multiple client devices. For example, the destination tag may indicate some or all client devices associated with a business (e.g., having a user identifier of an employee at the business, such as a business email address associated with the business), some or all client devices located within a given premises, or some or all client devices participating in the conference. For the manually generated message 602, the destination tag may be generated by a user (e.g., of the administrator client device 406 or the host client device 412) entering user identifiers associated with the client devices to receive the manually generated message 602. Alternatively, the computing node 402 may automatically (e.g., by lookup in a data repository based on text in the manually generated message 602) determine which users are relevant to the manually generated message 602 and add client devices of those users to the destination tag. A user of a client device that generated the message may be asked, via the client device of that user, to confirm that user identifiers associated with the client devices that were added to the destination tag are to receive the manually generated message 602. For the message based on the automatically generated data 604, the destination tag may be automatically generated at the computing node 402 based on geographic locations of the client devices in the conference (e.g., if there is a fire or gas leak, client devices in the geographic location where the fire is occurring are to be notified) or based on whether the user of a client device in the conference is responsible for certain conditions (e.g., if a door is opened, a security guard responsible for ensuring that the door is closed may be notified). The geographic locations of the client devices may be determined based on whether the client device is connected directly to the computing node 402 or based on a global positioning system (GPS), cellular signal or Wi-Fi® signal of the client device, if the user of the client device provides affirmative consent for sharing the location of the client device with the computing node 402.

The computing node 402 uses an event classifier 608 and applies a message time-to-live value to the messages to determine a configuration for the messages when the messages are displayed at the client devices. The event classifier 608 determines an urgency level (e.g., low or high) associated with the message. For example, a supervisory message asking a subordinate to speak more slowly may have a low urgency level, while a message indicating the presence of an active shooter or a fire may have high urgency level. For the manually generated message 602, the user may specify the urgency level via a user interface for generating the message. For messages based on automatically generated data 604, the urgency level may be automatically determined based on a source of the message (e.g., a message associated with the fire alarm system 502 may have a high urgency level, while a message associated with the network quality meter 410 may have a low urgency level, as a fire is likely to be much more dangerous than a network quality event). For messages based on automatically generated data 604, a database or other data store may be consulted to determine the urgency level based on the source of the message and, in some cases, values associated with the message (e.g., a temperature reading of 100 C might be associated with a higher urgency level than a temperature reading of 50 C). The urgency level may be one of low, medium, or high. Alternatively, the urgency level may be one of red, yellow, or green. In another alternative, the urgency level may be a numeric score (e.g., a number between 1 and 5 or a number between 1 and 10). In some implementations, the computing node 402 stores a table or other data structure listing the sensors 408 and the network quality meter 410 and an associated urgency level for messages generated based on each of the listed sensors 408 and network quality meter 410. In some examples, the event severity classifier may classify the message, based on a source of the message or the data used to generate the message, as at least one of: a real-time message (e.g., the emergency message 420), a service notification (e.g., a message based on the sensor data 422), a network notification (e.g., a message based on the network quality data 424), and an informational notification (e.g., the supervisory message 426). In some cases, an informational notification may be generated based on sensor data 422 from sensors 420 that provide information that is not urgent (e.g., a cafeteria door is open at a time when the cafeteria door should be closed). In some cases, a supervisory message 426 may be a real time message. For example, a supervisor might tell a subordinate not to discuss confidential information in a conference that includes participants who are not employed at the same business as the supervisor.

The message time-to-live value indicates an amount of time for which the message is to be displayed at the client device and whether the message is to be dismissible (e.g., to have a dismiss icon) at the client device. For the manually generated message 602, the message time-to-live value may be set by a user within a user interface for generating the message. For the automatically generated message 604, the message time-to-live value may be determined based on a source of the message (e.g., a message associated with the fire alarm system 502 may not be dismissible until the fire is extinguished or the meeting is over, while a message associated with the network quality meter 410 may have a time-to-live value of one minute and may be dismissible) and/or based on a value associated with the message. In some embodiments, the message time-to-live value may be determined based on whether the message is the real-time message, the service notification, the network notification or the informational notification.

After the event classifier 608 and the message time-to-live value are applied, the computing node 402 provides the message (e.g., either the manually generated message 602 or the automatically generated message 604) to the service message pipe 428. The service message pipe 428 provides the message to the client devices specified in the destination tag. In the example shown, the message is provided to a conference room client device 610 and a personal client device 612. The conference room client device 610 may be a dedicated speaker and monitor system for a conference room which is designed for multiple simultaneous users. The personal client device 612 may be a client device designed for a single user, for example, a desktop computer, a laptop computer, a mobile phone, or a tablet computer. In some implementations, a splash may be used to display the message at the conference room client device 610, while a ribbon (e.g., as shown in FIG. 7) may be used to display the notification at the personal client device 612. As used herein, the term "splash" may indicate a full screen display message that is configured to be visible to all physical meeting participants located in the same room. For example, the message may be displayed on a horizontal line centered halfway from the top of the screen to the bottom of the screen. This message may be displayed prominently so that each meeting participant, regardless of the seating row or distance from the display, is to be able to view the message (which may be an emergency message) and act on it in a timely manner. The splash may be contrasted with a ribbon, where a ribbon might not be visible to all of the in-room meeting participants.

In one example use case, a wind speed sensor at a premises in Oklahoma City measures wind speed to generate automatically generated data 604. At a first time point, the automatically generated data 604 indicates a wind speed of 15 kilometers per hour (km/h). The automatically generated data 604 is provided to the node input pipe 606 at the computing node 402. The computing node 402 determines that 15 km/h is below a threshold of 75 km/h at which a message is to be sent to the client devices 610, 612. Thus, the computing node 402 does not take any further actions (according to the process described in conjunction with FIG. 6) with respect to the 15 km/h wind speed.

At a second time point, the automatically generated data 604 from the wind speed sensor indicates that the wind speed is 85 km/h. This wind speed is above the threshold of 75 km/h at which a message is to be sent and displayed, but below a threshold of 95 km/h at which the message is to be displayed in bold letters and not capable of being dismissed. The thresholds may be stored at the computing node 402 and set by an administrator responsible for managing the messaging system disclosed herein. A wind speed exceeding 95 km/h may be a high security event, while a wind speed between 75 km/h and 95 km/h may be a medium security event. The node input pipe 606 determines that the indicated wind speed of 85 km/h exceeds the threshold of 75 km/h. Thus, the computing node 402 generates text for a message (e.g., "wind speed is 85 km/h—be careful if going outside") and applies the destination tag indicating all client devices located in the premises or having a work location in the premises are to receive the message. The text may be generated based on a pre-stored message format created by an administrator. For example, the administrator may create, via an administrator client device 406 that has access to the computing node 402, the message format "wind speed is <<wind speed>> km/h—be careful if going outside".

The computing node applies the event classifier 608 to determine that a medium security event is taking place, as the wind speed is greater than 75 km/h and less than 95 km/h. A configuration of the message (e.g., not bold letters, capable of being dismissed) may be set based on the determination that the message corresponds to a medium security event. The computing node 402 applies a message time-to-live value to the message based on the medium security event status of the message and the source of the message (the wind speed sensor). For example, the computing node 402 may store a table (or other data structure) indicating that the message time-to-live value for medium security event messages from the wind speed sensor should have a time-to-live of 30 minutes, causing the message to be displayed at the client devices 610, 612 for a maximum of 30 minutes. Accordingly, the message time-to-live value of 30 minutes is set. The message is transmitted to the service message pipe 428. The service message pipe 428 transmits the message to the conference room client device 610 and to the personal client device 612 for display thereat.

The message processing technique may be extended to provide audio messages in audio-only conferences to client devices (e.g., the personal client device 612) accessing the conference via a phone number or to client devices that have the screen turned off or the conference minimized or in the background. For the audio messaging technique, the audio of the conference may be briefly interrupted, at the client devices receiving the message, in order to play the alert. The audio messages may be generated using text-to-speech, a recording from an administrator client device 406 or host client device 412, or a pre-recorded message (e.g., related to network or sensor-related information or based on the automatically generated data 604). The computing node 402 (or the server 404) may access an audio message for playback during an audio conference, identify one or more audio participant devices to which the audio message is to be addressed, and interrupt, at the one or more audio participant devices (and not at other devices) an audio feed of the audio conference to playback the audio message.

FIG. 7 illustrates an example GUI 700 associated with a conference. The GUI 700 may be output at a display of a computing device participating in the conference, for example, one or more of the client devices 412, 414, 416, 418, 610, or 612.

As shown, the GUI 700 includes a title bar 702. As shown, the title bar 702 includes circular buttons 704 which, when selected, close, minimize (e.g., run in background), or maximize the GUI 700. In alternative implementations, the buttons 704 may have other shapes or be located in the top right corner instead of the top left corner. It should be noted that the title bar 702 and/or the buttons 704 might not exist in some implementations. For example, the title bar 702 and/or the buttons 704 might not be shown at a mobile phone, at a tablet computer, or in a full screen view at a laptop computer or desktop computer. The GUI 700 includes a ribbon 706 displaying a message—"Public Safety Alert: Shelter in place. Active threat."—as disclosed herein. The message in the ribbon 706 may be transmitted to the device displaying the GUI 700 using the techniques disclosed herein. For example, the message in the ribbon 706 may be an emergency message 420 from the administrator client device 406. A configuration transmitted with the message may specify a color of the ribbon and a font, size, and dressing (e.g., bold, italic, or underlined) of the message. The configuration may be specified at the administrator client device 406 that generated the message and/or determined using the event classifier 608. The position and shape of the ribbon 706 may be determined based on a setting of software associated with the conference at the device displaying the GUI 700. The setting may be determined based on the device type (e.g., a make and model of the device).

The GUI 700 also includes video feeds 708 from other conference participants, an in-conference chat 710, and a control button bar 712. As shown, the control button bar 712 includes control buttons for a participant or speaker in the conference. The control buttons, when selected, may perform different functionality, for example, to mute/unmute the microphone, to start/stop the video feed from a webcam of the device, to record the conference, or to share a screen.

As illustrated in FIG. 7, the ribbon 706 prominently displays the message transmitted to the device associated with the GUI 700 using the techniques described herein. Other messages are displayed within the in-conference chat 710. The messages in the in-conference chat 710 may be received from any host or participant in the conference and might, in at least some cases, not be relevant or useful for a user of the device. Thus, the messages in the in-conference chat 710 are displayed less prominently than the messages in the ribbon 706 and may, in some cases, be minimized or not shown at all unless the user of the device associated with the GUI 700 selects a chat button in the control button bar 712. As a result, it is very likely that the user of the device will notice and read a message in the ribbon 706, and less likely that the user of the device will notice or read messages in the in-conference chat 710. That is, messages in the in-conference chat 710 are sometimes ignored by participants in the conference who are more focused on the incoming video feed or screensharing feed.

Figure 8:
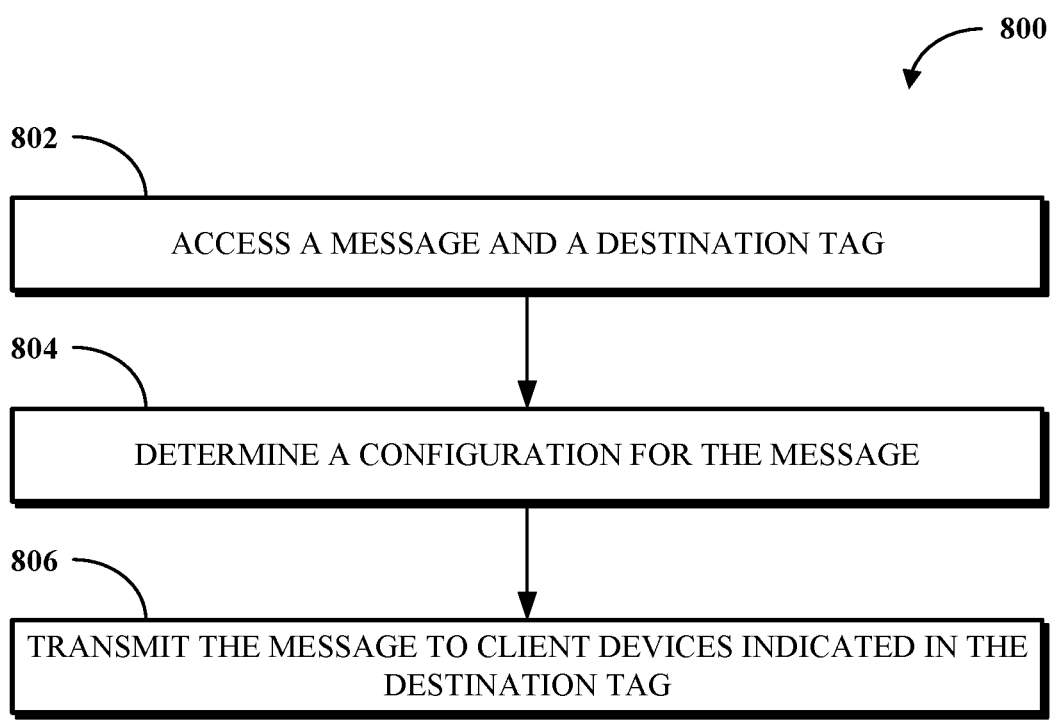
FIG. 8 is a flowchart of an example of a technique for transmitting a message during a conference.
Figure 9:
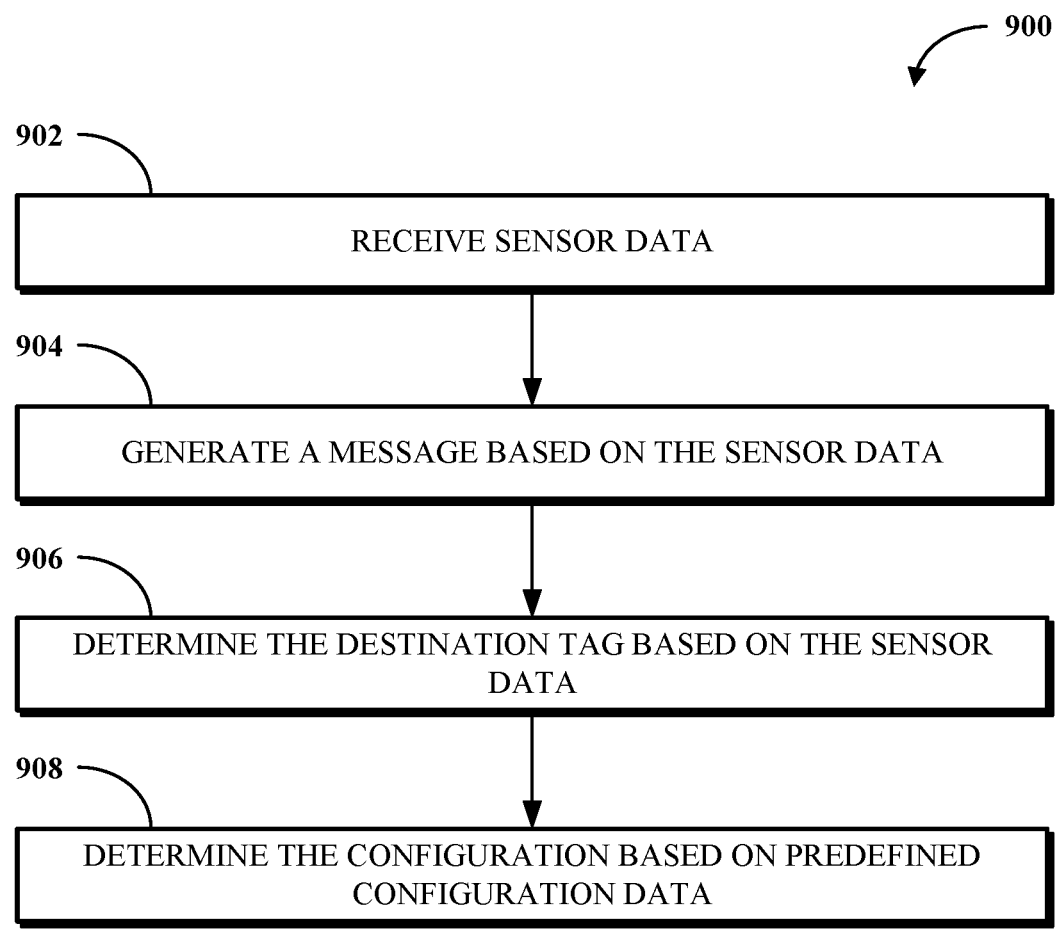
FIG. 9 is a flowchart of an example of a technique for generating a message based on sensor data during a conference.
Figure 10:
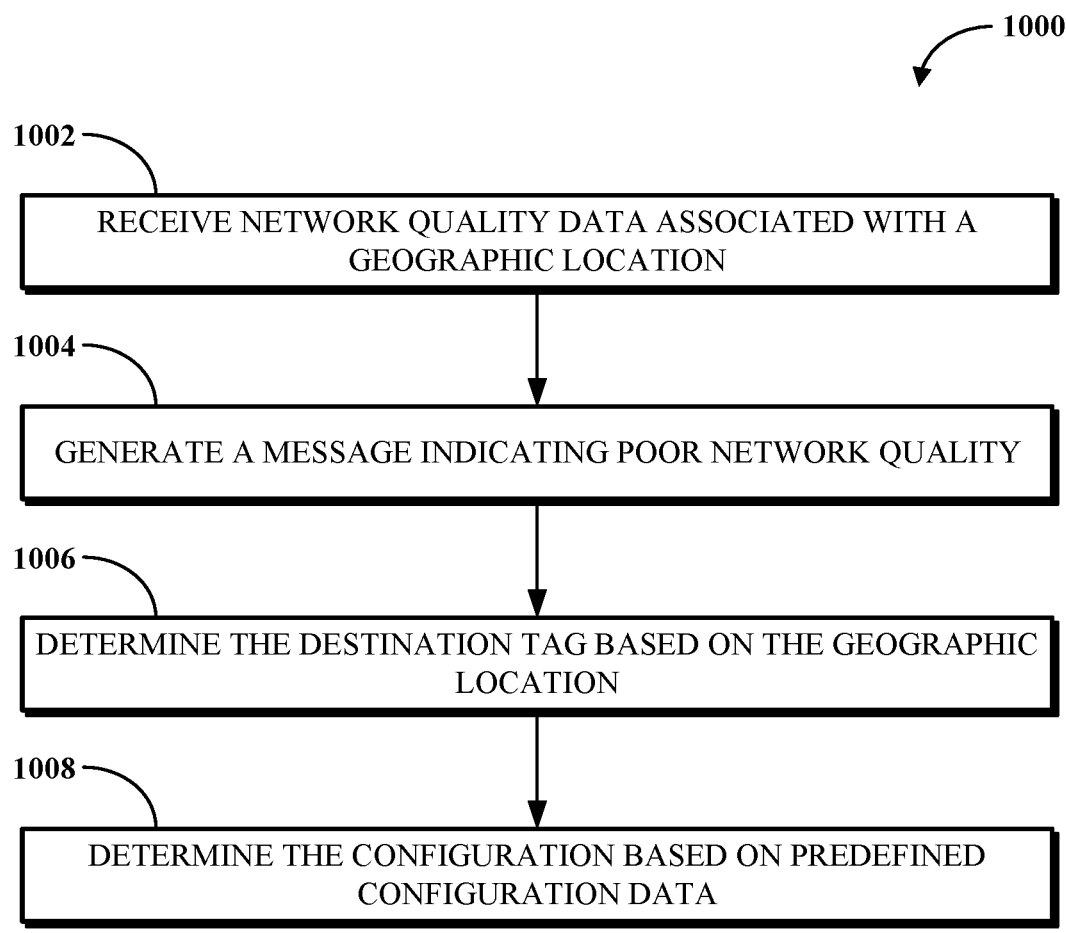
FIG. 10 is a flowchart of an example of a technique for generating a message based on network quality data during a conference.
Figure 11:
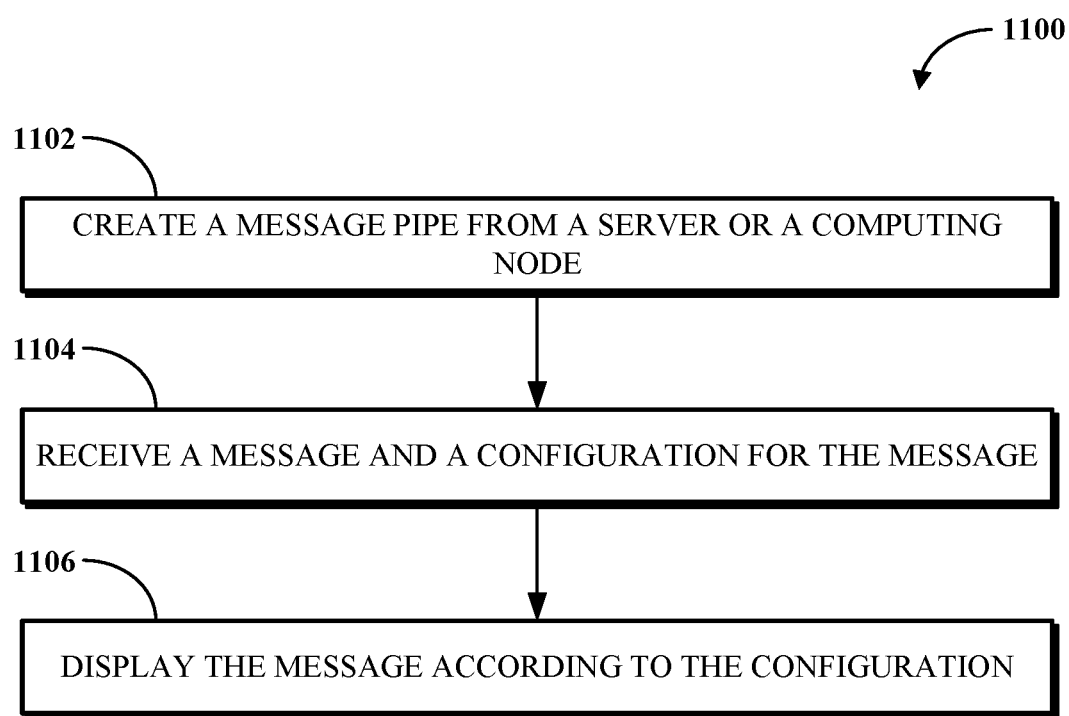
FIG. 11 is a flowchart of an example of a technique for displaying a message during a conference.

To further describe some implementations in greater detail, reference is next made to examples of techniques for generating, transmitting, and receiving a message for display within a graphical interface of a conference. FIG. 8 is a flowchart of an example of a technique 800 for transmitting a message during a conference. FIG. 9 is a flowchart of an example of a technique 900 for generating a message based on sensor data during a conference. FIG. 10 is a flowchart of an example of a technique 1000 for generating a message based on network quality data during a conference. FIG. 11 is a flowchart of an example of a technique 1100 for displaying a message during a conference.

The techniques 800, 900, 1000, 1100 can be executed using computing devices, such as the systems, hardware, and software described with respect to FIGS. 1-7. The techniques 800, 900, 1000, 1100 can be performed, for example, by executing a machine-readable program or other computer-executable instructions, such as routines, instructions, programs, or other code. The steps, or operations, of the techniques 800, 900, 1000, 1100 or another technique, method, process, or algorithm described in connection with the implementations disclosed herein can be implemented directly in hardware, firmware, software executed by hardware, circuitry, or a combination thereof.

For simplicity of explanation, each of the techniques 800, 900, 1000, 1100 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

As described above, FIG. 8 is a flowchart of an example of the technique 800 for transmitting the message during the conference. The technique 800 is described here as being implemented at the computing node 402. Alternatively, the technique 800 may be implemented at a server that performs the functions of the computing node 402 described below.

At block 802, the computing node 402 accesses a message and a destination tag indicating one or more client devices participating in a conference to receive the message. The message may be manually generated at a client device (e.g., the manually generated message 602 may be generated at the administrator client device 406 or the host client device 412). Alternatively, the message may be automatically generated (e.g., the automatically generated message 604) from the sensor data 422 or the network quality data 424 accessed at the computing node 402. Techniques for automatically generating the message and the destination tag based on the sensor data 422 or the network quality data 424 are described in conjunction with FIG. 9 and FIG. 10.

At block 804, the computing node 402 determines a configuration for the message. The configuration may include at least one of a text color, a highlighting color, a time duration for displaying the message, whether the message includes a dismiss icon, or whether the message includes a confirmation icon. The configuration may be determined based on a source of the message or the data used to generate the message. For example, different configurations may apply to each of the emergency message 420 from the administrator client device 406, the message based on the sensor data 422 from the sensors 408, the message based on the network quality data 424 from the network quality meter 410, and the supervisory message 426. In some implementations, the emergency message 420 is displayed in bold red letters with a yellow background and is not dismissible. The supervisory message 426 is displayed in black letters with a white background and is dismissible. The message based on the sensor data 422 is displayed in italics and is automatically dismissed after 60 seconds. The message based on the network quality data 424 is underlined and is automatically dismissed after 30 seconds. In some implementations, configurations may be determined based on an intensity of a value in the message. For example, the message about wind speed based on data from a wind speed sensor may be displayed in size 12 font and may be dismissible when the wind speed is between 75 km/h and 95 km/h, and the message may be displayed in size 18 font and may not be dismissible when the wind speed exceeds 95 km/h.

For the message based on the automatically generated data 604, the configuration may also be automatically generated using a table (or other data structure) at the computing node 402 (or a data repository accessible to the computing node 402) that maps sources and/or values of automatically generated data to configurations. For the manually generated message 602, the configuration may be manually generated by a user of a device at which the manually generated message 602 was generated (e.g., the administrator client device 406 or the host client device 412). Alternatively, for the manually generated message 602, the configuration may be determined based on predefined configuration data associated with the device at which the manually generated message 602 was generated. The predefined configuration data may be stored at the computing node 402 or at a data repository accessible to the computing node 402.

At block 806, the computing node 402 transmits the message to one or more client devices indicated in the destination tag to configure the one or more client devices to display the message. The message is displayed, at the one or more client devices, within a display region associated with the conference, for example, as illustrated in FIG. 7. In some implementations, the computing node 402 creates the service message pipe 428 from the computing node 402 to each client device upon the client device joining the conference. The service message pipe 428 transmits the message to the client device upon a latter of the client device joining the conference or accessing (at the block 802) the message at the computing node 402. Techniques for processing the message, via the service message pipe, at the client device are described in conjunction with FIG. 11.

In some implementations, the configuration indicates that the message includes a confirmation icon. The computing node 402 receives an indication of selection of the confirmation icon from a subset of the client devices receiving the message. The computing node 402 transmits, to the host client device 412 or the administrator client device 406, identifying information (e.g., a user identifier) of at least one client device of the client devices that is not a member of the subset.

In some situations, a message may be transmitted to a subset of the client devices participating in the conference. For example, if there is a hurricane in Miami, a hurricane alert message could be transmitted to client devices in the Miami office of a business (or other client devices whose geographic location is known to be in Miami) but not to client devices located in other places. The computing node 402 may generate a modified message based on the message transmitted to the client devices in Miami. The computing node 402 may transmit the modified message to an additional client device participating in the meeting which did not receive the hurricane alert message. As a result, a user of the additional client device may be notified of the situation in the Miami office and may terminate the meeting early or understand why participants in the Miami office may be distracted or may wish to leave early. These implementations may be useful in a call center setting. For example, if a customer is attending a conference with a call center employee, and there is an emergency at the office of the call center employee, it may be useful to notify the customer so that the customer understands why the call center employee may be distracted or requests to terminate the call.

In some implementations, the computing node 402 accesses an in-conference chat message transmitted from a first client device to a second client device. Each of the first client device and the second client device is participating in the conference. For example, the first client device and the second client device may be different ones of the client devices 412, 414, 416, 418 participating in the conference. The computing node 402 transmits the in-conference chat message for display at the second client device in a chat display region (e.g., the in-conference chat 710). The chat display region is different from the display region associated with the conference where the message is displayed (e.g., the ribbon 706) when the message is sent to the second client device using the technique 800 of FIG. 8 (i.e., the second client device is included in the destination tag).

As described above, FIG. 9 is a flowchart of an example of the technique 900 for generating the message based on sensor data during the conference. The technique 900 is described here as being implemented at the computing node 402. Alternatively, the technique 900 may be implemented at a server that performs the functions of the computing node 402 described below.

At block 902, the computing node 402 receives sensor data from a sensor 408 at a premises. The sensor 408 may be configured to periodically (e.g., once every five minutes) transmit data to the computing node 402. Alternatively, the sensor 408 may transmit data to the computing node 402 upon the sensor data reaching a threshold value or falling within a predefined range. For example, the sensor 408 may be a thermometer that may transmit the temperature to the computing node 402 every five minutes, and the computing node 402 may include intelligence to create a message whenever the temperature falls within a predefined range (e.g., above 32 C or below 0 C). Alternatively, the thermometer may be programmed to notify the computing node 402 of the temperature whenever the temperature enters the predefined range. The premises may include both the computing node 402 and the sensor 408. For example, the premises may be an office that includes the computing node 402 and sensors 408 including the fire alarm 502, the physical security system 504, the security camera system 506, and other on-premises systems 508.

At block 904, the computing node 402 generates a message based on the sensor data. The message may be generated by combining an identifier of the sensor 408 associated with the sensor data and a measurement from the sensor (e.g., "thermometer at front door, 21 C"). Alternatively, the computing node 402 may store (or be capable of accessing a data repository that stores) a table (or other data structure) that maps measurements from sensors to messages. For example, a temperature sensor in the fire alarm 502 may generate the message, "fire in building," when a temperature (e.g., at a thermometer of the fire alarm) exceeds 50 C. Alternatively, a smoke sensor in the fire alarm 502 may generate the message, "fire in building," when the smoke concentration exceeds a threshold.

At block 906, the computing node 402 determines the destination tag for the message based on the sensor data, a stored geographic location of the one or more client devices, and stored data indicating a role of a user of the one or more client devices. In some implementations, the computing node 402 stores (or is capable of accessing the data repository that stores) a table (or other data structure) that maps generated messages to destination tags. For example, the message "fire in building" may have a destination tag of all client devices in the premises. A message indicating that a vault is unlocked may have a destination tag of the client device of a security guard or a custodian who is responsible for locking the vault. A message indicating a chemical leak at a factory may have a destination tag of client devices located in the factory or client devices of staff members responsible for handling the chemical leak, regardless of geographic location.

At block 908 the computing node 402 determining the configuration for the message based on predefined configuration data. In some implementations, the computing node 402 stores (or is capable of accessing the data repository that stores) a table (or other data structure) that maps generated messages to configurations. In some implementations, the configuration may include an indication of whether an additional message is to be transmitted to client devices in the conference that are not in the destination tag. The message may be transmitted (for example, according to the technique 800 described in conjunction with FIG. 8) to client devices indicated in the destination tag for display thereat according to the configuration.

As described above, FIG. 10 is a flowchart of an example of the technique 1000 for generating the message based on network quality data during the conference. The technique 1000 is described here as being implemented at the computing node 402. Alternatively, the technique 1000 may be implemented at a server that performs the functions of the computing node 402 described below.

At block 1002, the computing node 402 receives the network quality data 424 associated with a geographic location. The geographic location may be a geographic location where the computing node 402 is located, such as the premises where the computing node 402 is located. The geographic location may include a geographic area covered by network infrastructure, for example, a router or a network node. Alternatively, the geographic location may include a single computing device (e.g., one of the client devices 412, 414, 416, 418 in the conference) that is experiencing network connectivity problems. The network quality data 424 may include a jitter measurement or a network speed measurement. In some implementations, the network quality data 424 may be received from the network quality meter 410.

After receiving the network quality data 424, the computing node 402 determines whether the network quality data 424 corresponds to poor network quality. The poor network quality may be determined based on a jitter measurement exceeding a jitter threshold (e.g., 40 milliseconds) or a network speed measurement being below a network speed threshold (e.g., 3 megabits per second). At block 1004, the computing machine generates the message indicating the poor network quality upon determining that the network quality data 424 corresponds to the poor network quality. The message indicating poor network quality may include the text, "poor network quality." Alternatively, the message may specify the network speed measurement or the jitter measurement.

At block 1006, the computing node 402 determines the destination tag based on the geographic location. The destination tag may include all client devices in the geographic location (or connected to impacted network infrastructure) that are participating in the conference. Alternatively, if the network quality data 424 is associated with specific devices, the destination tag may include those specific devices. The computing node 402 may identify the client devices in the geographic location or connected to the impacted network infrastructure using Internet Protocol addresses of the client devices or using stored data (e.g., a default geographic location) about the client devices.

At block 1008, the computing node 402 determines the configuration based on predefined configuration data. In some implementations, the computing node 402 (or the data repository accessible to the computing node 402) stores a configuration for poor network quality messages that is used for all poor network quality messages. Alternatively, different configurations may be used for different levels of network quality. For example, if the network quality is very poor (e.g., jitter exceeding 60 milliseconds or network speed below 1 megabit per second), larger or more decorated (e.g., bold) text may be used so that the users of the impacted computing devices are more encouraged to take action (e.g., disable the video feed) to mitigate the very poor network quality. The message may be transmitted (for example, according to the technique 800 described in conjunction with FIG. 8) to client devices indicated in the destination tag for display threat according to the configuration.

As described above, FIG. 11 is the flowchart of an example of the technique 1100 for displaying the message during the conference. The technique 1100 may be performed at one of the client devices 412, 414, 416, 418, 610, 612.

At block 1102, the client device creates a service message pipe (e.g., the service message pipe 428) from the server 404 or the computing node 402 to the client device upon the client device joining a conference. In some implementations, the client device creates the service message pipe from the computing node if the computing node 402 is available on a local network of the client device (e.g., as shown in FIG. 4 for the client devices 412, 414, 416). The client device creates the service message pipe from the server 404 if the computing node 402 is not available on the local network (e.g., as shown in FIG. 4 for the client device 418). The server 404 may communicate with the computing node 402 to process messages for the service message pipe.

At block 1104, the client device receives a message and a configuration for the message via the service message pipe during the conference. In some implementations, the service message pipe is a unidirectional pipe from the server or the computing node to the client device. In some implementations, the service message pipe is a bidirectional pipe. The client device transmits an acknowledgement of receipt of the message to the server or the computing node via the service message pipe.

At block 1106, the client device displays the message within a display region associated with the conference according to the received configuration and a local setting. The received configuration may include a text color, a highlighting color, a time duration for displaying the message, whether the message includes a dismiss icon, or whether the message includes a confirmation icon. In some implementations, the client device removes the service message pipe upon leaving the conference or termination of the conference. The local setting may be based on a device type (e.g., conference room device, desktop/laptop computer, or mobile phone/tablet computer) of the client device receiving the message. The local setting may specify a position, within the display region associated with the conference, where the message is displayed.

In some implementations, the client device receives an in-conference chat message. The client device displays the in-conference chat message within a chat display region (e.g., the in-conference chat 710). The chat display region is different from the display region associated with the conference (e.g., the ribbon 706) where the message is displayed.

Some implementations are described below as numbered examples (Example 1, 2, 3, etc.). These examples are provided as examples only and do not limit the other implementations disclosed herein.

Example 1 is a method comprising: accessing a message and a destination tag indicating one or more client devices participating in a conference to receive the message; determining a configuration for the message based on a source of the message; and transmitting the message to the one or more client devices indicated in the destination tag to configure the one or more client devices to display the message according to the configuration within a display region associated with the conference.

In Example 2, the subject matter of Example 1 includes, creating a message pipe from a server to a client device of the one or more client devices upon the client device joining the conference, wherein the message pipe transmits the message to the client device upon a latter of the client device joining the conference or accessing the message at the server.

In Example 3, the subject matter of Examples 1-2 includes, wherein the configuration comprises at least one of a text color, a highlighting color, a time duration for displaying the message, whether the message includes a dismiss icon, or whether the message includes a confirmation icon.

In Example 4, the subject matter of Examples 1-3 includes, receiving, from a sensor at a premises, sensor data at a computing node that transmits the message; generating the message based on the sensor data; determining the destination tag based on the sensor data, a stored geographic location of the one or more client devices, and stored data indicating a role of a user of the one or more client devices; and determining the configuration based on predefined configuration data.

In Example 5, the subject matter of Examples 1-4 includes, receiving network quality data associated with a geographic location, wherein the network quality data comprises at least one of latency exceeding a latency threshold, jitter exceeding a jitter threshold or network speed below a network speed threshold; generating the message indicating poor network quality; determining the destination tag based on the geographic location; and determining the configuration based on predefined configuration data.

In Example 6, the subject matter of Examples 1-5 includes, receiving the message and destination data from a sender device, wherein the sender device comprises a host client device of the conference; determining the destination tag based on the destination data; and determining the configuration based on predefined configuration data associated with the host client device.

In Example 7, the subject matter of Examples 1-6 includes, receiving the message, destination data, and configuration data from a sender device, wherein the sender device comprises an administrator client device; determining the destination tag based on the destination data; and determining the configuration based on the configuration data.

In Example 8, the subject matter of Examples 1-7 includes, wherein the configuration comprises that the message includes a confirmation icon, the method further comprising: receiving an indication of selection of the confirmation icon from a subset of the one or more client devices; and transmitting, to a host client device of the conference or to an administrator client device, identifying information of a client device of the one or more client devices that is not in the subset.

In Example 9, the subject matter of Examples 1-8 includes, generating a modified message based on the message transmitted to the one or more client devices; and transmitting the modified message to an additional client device participating in the conference, wherein the additional client device is not included in the one or more client devices.

In Example 10, the subject matter of Examples 1-9 includes, wherein the one or more client devices are located at a premises, and wherein the message is transmitted via a computing node located at the premises.

In Example 11, the subject matter of Examples 1-10 includes, accessing an in-conference chat message transmitted from a first client device of the one or more client devices to a second client device of the one or more client devices; and transmitting the in-conference chat message to the second client device for display at the second client device in a chat display region, wherein the chat display region is different from the display region associated with the conference where the message is displayed.

Example 12 is an apparatus comprising: a memory; and a processor configured to execute instructions stored in the memory to: access a message and a destination tag indicating one or more client devices participating in a conference to receive the message; determine a configuration for the message based on a source of the message; and transmit the message to the one or more client devices indicated in the destination tag to configure the one or more client devices to display the message according to the configuration within a display region associated with the conference.

In Example 13, the subject matter of Example 12 includes, the processor being further configured to execute instructions stored in the memory to: create a message pipe to a client device of the one or more client devices upon the client device joining the conference, wherein the message pipe transmits the message to the client device upon a latter of the client device joining the conference or accessing the message.

In Example 14, the subject matter of Examples 12-13 includes, the processor being further configured to execute instructions stored in the memory to: determine, using an event classifier at the apparatus, an urgency level associated with the message, wherein the configuration is determined based on the urgency level.

In Example 15, the subject matter of Examples 12-14 includes, the processor being further configured to execute instructions stored in the memory to: receive network quality data associated with the one or more client devices, wherein the network quality data comprises at least one of jitter exceeding a jitter threshold or network speed below a network speed threshold; generate the message indicating poor network quality; and determine the destination tag to include the one or more client devices.

In Example 16, the subject matter of Examples 12-15 includes, the processor being further configured to execute instructions stored in the memory to: receive the message and destination data from a sender device, wherein the sender device comprises an administrator client device; determine the destination tag based on the destination data; and determine the configuration based on predefined configuration data associated with the administrator client device.

In Example 17, the subject matter of Examples 12-16 includes, the processor being further configured to execute instructions stored in the memory to: receive the message, destination data, and configuration data from a sender device, wherein the sender device comprises a host client device of the conference; determine the destination tag based on the destination data; and determine the configuration based on the configuration data.

Example 18 is a computer-readable medium storing instructions operable to cause one or more processors to perform operations comprising: accessing a message and a destination tag indicating one or more client devices participating in a conference to receive the message; determining a configuration for the message based on a source of the message; and transmitting the message to the one or more client devices indicated in the destination tag to configure the one or more client devices to display the message according to the configuration within a display region associated with the conference.

In Example 19, the subject matter of Example 18 includes, wherein the configuration comprises that the message includes a confirmation icon, the computer-readable medium further storing instructions operable to cause the one or more processors to perform operations comprising: receiving an indication of selection of the confirmation icon from a subset of the one or more client devices; and transmitting, to a host client device of the conference or to an administrator client device, identifying information of a client device in the subset.

In Example 20, the subject matter of Examples 18-19 includes, wherein the message and the destination tag are stored in a node input pipe, and wherein the node input pipe stores messages for processing by the one or more processors.

Example 21 is a method comprising: creating a message pipe from a server or a computing node upon joining a conference; receiving a message and a configuration for the message via the message pipe during the conference; and displaying the message within a display region associated with the conference according to the received configuration and a local setting.

In Example 22, the subject matter of Example 21 includes, wherein the message pipe is a unidirectional pipe from the server or the computing node to a device receiving the message.

In Example 23, the subject matter of Examples 21-22 includes, wherein the message pipe is a bidirectional pipe, the method further comprising: transmitting an acknowledgement of receipt of the message to the server or the computing node via the message pipe.

In Example 24, the subject matter of Examples 21-23 includes, wherein the received configuration specifies at least one of: a text color, a highlighting color, a time duration for displaying the message, whether the message includes a dismiss icon, or whether the message includes a confirmation icon.

In Example 25, the subject matter of Examples 21-24 includes, removing the message pipe upon leaving the conference or termination of the conference.

In Example 26, the subject matter of Examples 21-25 includes, receiving an in-conference chat message; and displaying the in-conference chat message within a chat display region, wherein the chat display region is different from the display region associated with the conference where the message is displayed.

In Example 27, the subject matter of Examples 21-26 includes, wherein the local setting is based on a device type of a device receiving the message, wherein the local setting specifies a position, within the display region associated with the conference, where the message is displayed.

In Example 28, the subject matter of Examples 21-27 includes, wherein creating a message pipe from a server or a computing node comprises: determining whether the computing node is accessible on a local network; and creating the message pipe from the computing node if the computing node is available on the local network; or creating the message pipe from the server if the computing node is not available on the local network.

Example 29 is an apparatus comprising: a memory; and a processor configured to execute instructions stored in the memory to: create a message pipe from a server or a computing node upon joining a conference; receive a message and a configuration for the message via the message pipe during the conference; and display the message within a display region associated with the conference according to the received configuration and a local setting.

In Example 30, the subject matter of Example 29 includes, the processor being further configured to execute instructions stored in the memory to: determine whether the computing node exists on a premises of the apparatus; create the message pipe from the computing node if the computing node exists on the premises; and create the message pipe from the server if the computing node does not exist on the premises.

In Example 31, the subject matter of Examples 29-30 includes, the processor being further configured to execute instructions stored in the memory to: determine whether the computing node exists on a premises of the apparatus based on whether the computing node exists on a local network to which the apparatus is connected.

In Example 32, the subject matter of Examples 29-31 includes, wherein the received configuration specifies at least one of: a text color, a highlighting color, or a time duration for displaying the message.

In Example 33, the subject matter of Examples 29-32 includes, the processor being further configured to execute instructions stored in the memory to: transmit, to the server or the computing node, an instruction to remove the message pipe upon leaving the conference or termination of the conference.

Example 34 is a computer-readable medium storing instructions operable to cause one or more processors to perform operations comprising: creating a message pipe from a server or a computing node upon joining a conference; receiving a message and a configuration for the message via the message pipe during the conference; and displaying the message within a display region associated with the conference according to the received configuration and a local setting.

In Example 35, the subject matter of Example 34 includes, wherein the local setting specifies a position, within the display region, where the message is displayed.

In Example 36, the subject matter of Examples 34-35 includes, wherein the local setting specifies that the message is to be displayed within a ribbon within the display region.

In Example 37, the subject matter of Examples 34-36 includes, wherein the received configuration specifies at least one of: whether the message includes a dismiss icon or whether the message includes a confirmation icon.

In Example 38, the subject matter of Examples 34-37 includes, the operations further comprising: removing the message pipe upon disconnecting from the conference.

In Example 39, the subject matter of Examples 34-38 includes, the operations further comprising: receiving an in-conference chat message in addition to the message received via the message pipe; and displaying the in-conference chat message within a chat display region, wherein the chat display region is different from the display region associated with the conference where the message is displayed.

In Example 40, the subject matter of Examples 34-39 includes, wherein the local setting is based on a device type of a device receiving the message.

Example 41 is at least one machine-readable medium including instructions that, when executed by processing circuitry, cause the processing circuitry to perform operations to implement of any of Examples 1-40.

Example 42 is an apparatus comprising means to implement of any of Examples 1-40.

Example 43 is a system to implement of any of Examples 1-40.

Example 44 is a method to implement of any of Examples 1-40.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
   creating a message pipe from a server or a computing node upon joining a conference, wherein creating the message pipe from the server or the computing node comprises:
     determining whether the computing node is accessible on a local network; and
     creating the message pipe from the computing node if the computing node is available on the local network; or
     creating the message pipe from the server if the computing node is not available on the local network;
   receiving a message and a configuration for the message via the message pipe during the conference; and
   displaying the message within a display region associated with the conference according to the received configuration and a local setting.

2. The method of claim 1, wherein the message pipe is a unidirectional pipe from the server or the computing node to a device receiving the message.

3. The method of claim 1, wherein the message pipe is a bidirectional pipe, the method further comprising:
   transmitting an acknowledgement of receipt of the message to the server or the computing node via the message pipe.

4. The method of claim 1, wherein the received configuration specifies at least one of: a text color, a highlighting color, a time duration for displaying the message, whether the message includes a dismiss icon, or whether the message includes a confirmation icon.

5. The method of claim 1, further comprising:
   removing the message pipe upon leaving the conference or termination of the conference.

6. The method of claim 1, further comprising:
   receiving an in-conference chat message; and
   displaying the in-conference chat message within a chat display region, wherein the chat display region is different from the display region associated with the conference where the message is displayed.

7. The method of claim 1, wherein the local setting is based on a device type of a device receiving the message, wherein the local setting specifies a position, within the display region associated with the conference, where the message is displayed.

8. An apparatus comprising:
   a memory; and
   a processor configured to execute instructions stored in the memory to:
     create a message pipe from a server or a computing node upon joining a conference, wherein creating the message pipe from the server or the computing node comprises:
       determining whether the computing node is accessible on a local network; and
       creating the message pipe from the computing node if the computing node is available on the local network; or
       creating the message pipe from the server if the computing node is not available on the local network;
     receive a message and a configuration for the message via the message pipe during the conference; and
     display the message within a display region associated with the conference according to the received configuration and a local setting.

9. The apparatus of claim 8, the processor being further configured to execute instructions stored in the memory to:
   determine whether the computing node exists on a premises of the apparatus based on whether the computing node exists on the local network to which the apparatus is connected.

10. The apparatus of claim 8, wherein the received configuration specifies at least one of: a text color, a highlighting color, or a time duration for displaying the message.

11. The apparatus of claim 8, the processor being further configured to execute instructions stored in the memory to:

transmit, to the server or the computing node, an instruction to remove the message pipe upon leaving the conference or termination of the conference.

12. A non-transitory computer-readable medium storing instructions operable to cause one or more processors to perform operations comprising:

creating a message pipe from a server or a computing node upon joining a conference, wherein creating the message pipe from the server or the computing node comprises:

determining whether the computing node is accessible on a local network; and creating the message pipe from the computing node if the computing node is available on the local network; or creating the message pipe from the server if the computing node is not available on the local network;

receiving a message and a configuration for the message via the message pipe during the conference; and displaying the message within a display region associated with the conference according to the received configuration and a local setting.

13. The computer-readable medium of claim 12, wherein the local setting specifies a position, within the display region, where the message is displayed.

14. The computer-readable medium of claim 12, wherein the local setting specifies that the message is to be displayed within a ribbon within the display region.

15. The computer-readable medium of claim 12, wherein the received configuration specifies at least one of: whether the message includes a dismiss icon or whether the message includes a confirmation icon.

16. The computer-readable medium of claim 12, the operations further comprising:

removing the message pipe upon disconnecting from the conference.

17. The computer-readable medium of claim 12, the operations further comprising:

receiving an in-conference chat message in addition to the message received via the message pipe; and displaying the in-conference chat message within a chat display region, wherein the chat display region is different from the display region associated with the conference where the message is displayed.

18. The computer-readable medium of claim 12, wherein the local setting is based on a device type of a device receiving the message.

* * * * *